Figure 1:
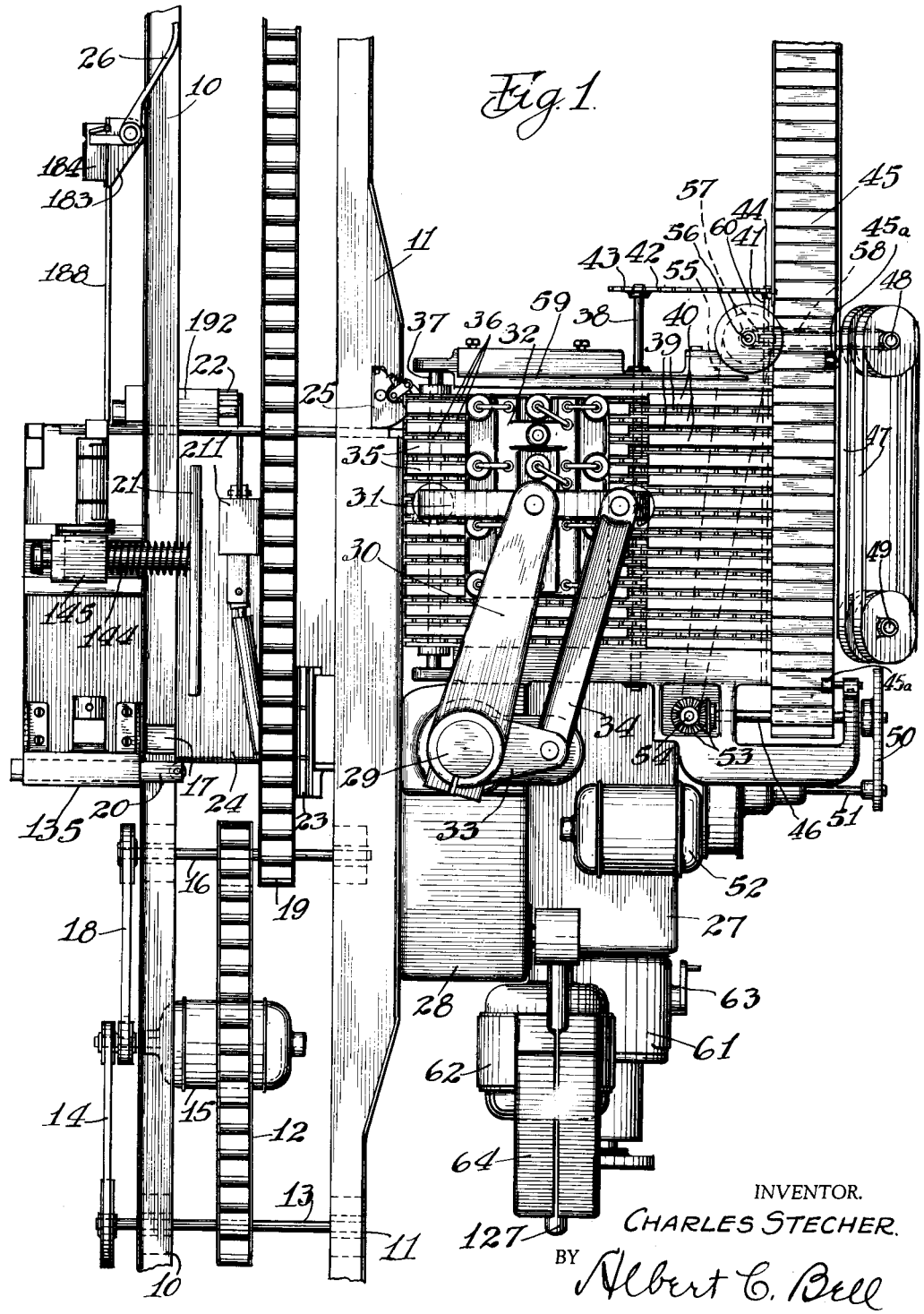

June 7, 1938.  C. STECHER  2,119,725
MACHINE FOR UNLOADING BOTTLES FROM CRATES
Filed Jan. 5, 1935   14 Sheets-Sheet 1

INVENTOR.
CHARLES STECHER.
BY Albert C. Bell
ATTORNEY.

June 7, 1938.                    C. STECHER                    2,119,725
                    MACHINE FOR UNLOADING BOTTLES FROM CRATES
                         Filed Jan. 5, 1935           14 Sheets-Sheet 2
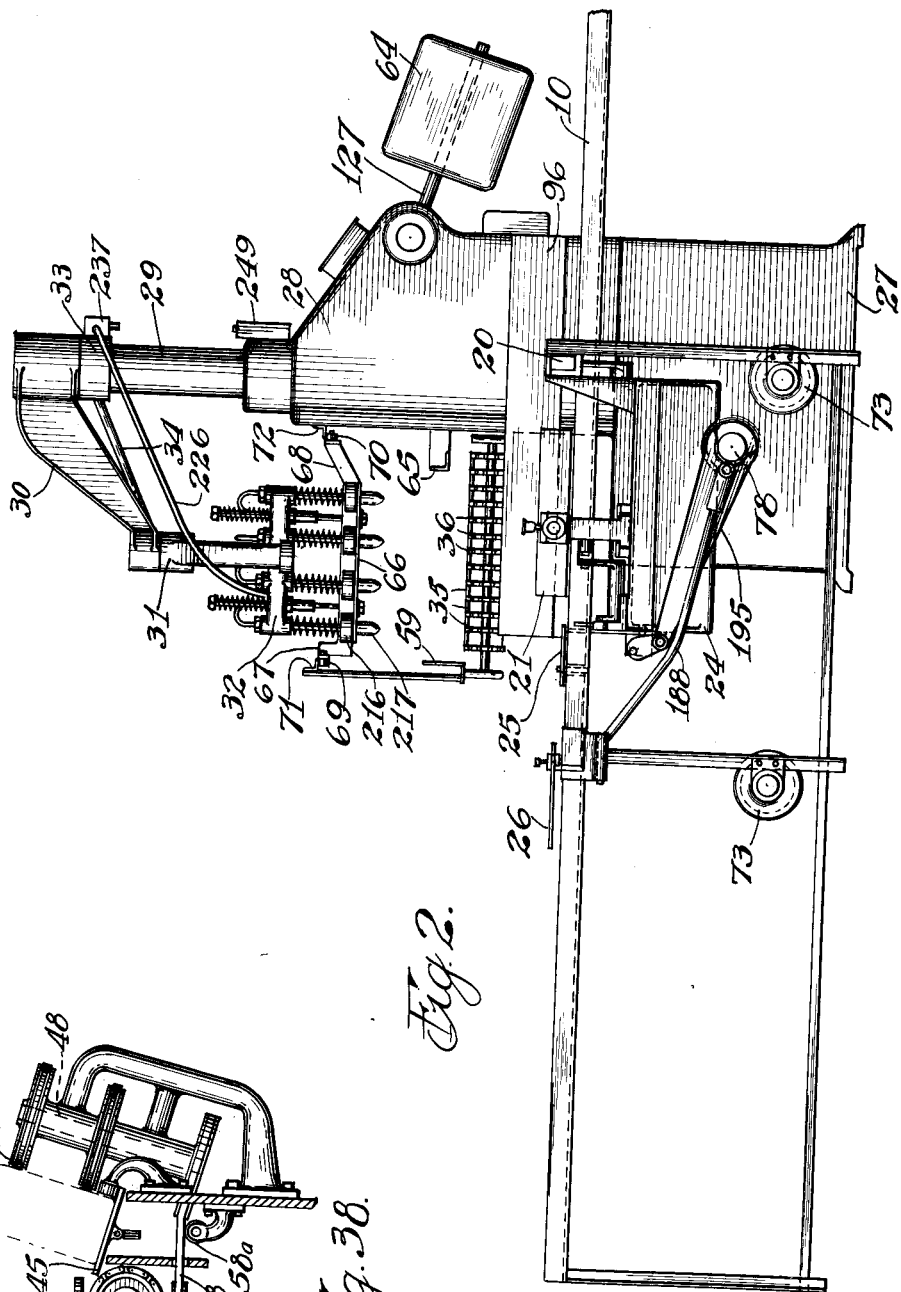
INVENTOR.
CHARLES STECHER
BY Albert C. Bell
                ATTORNEY.

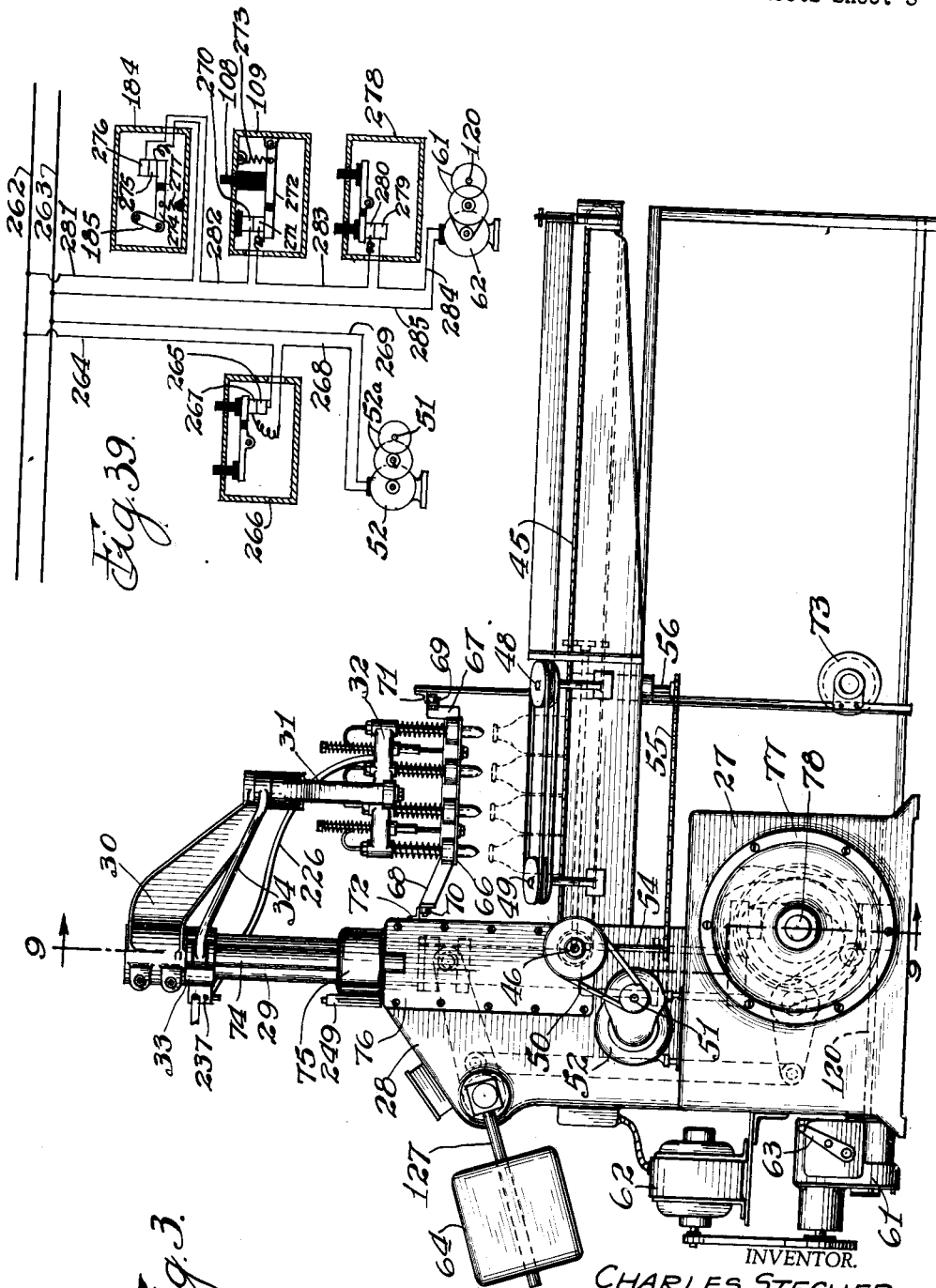

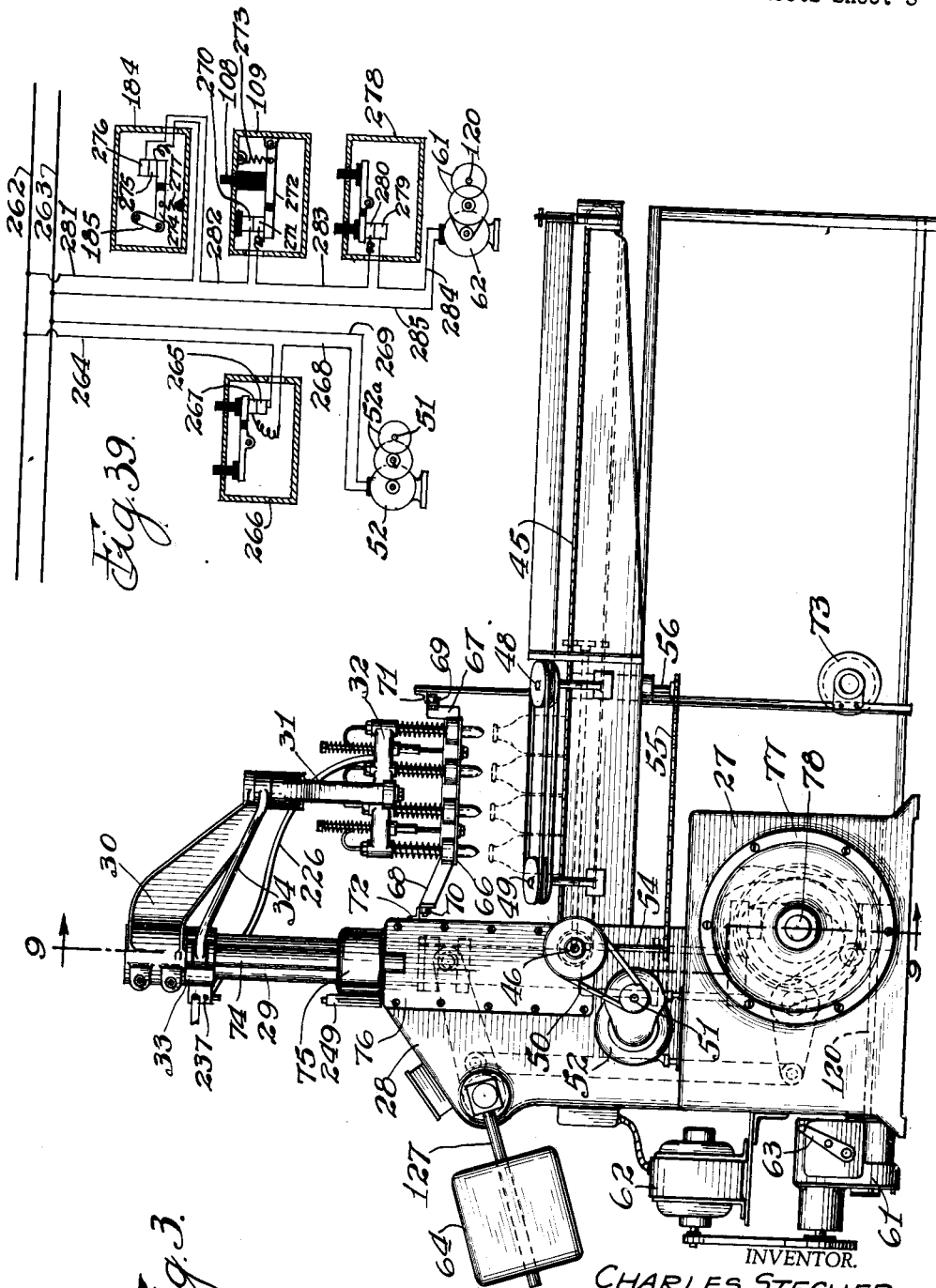

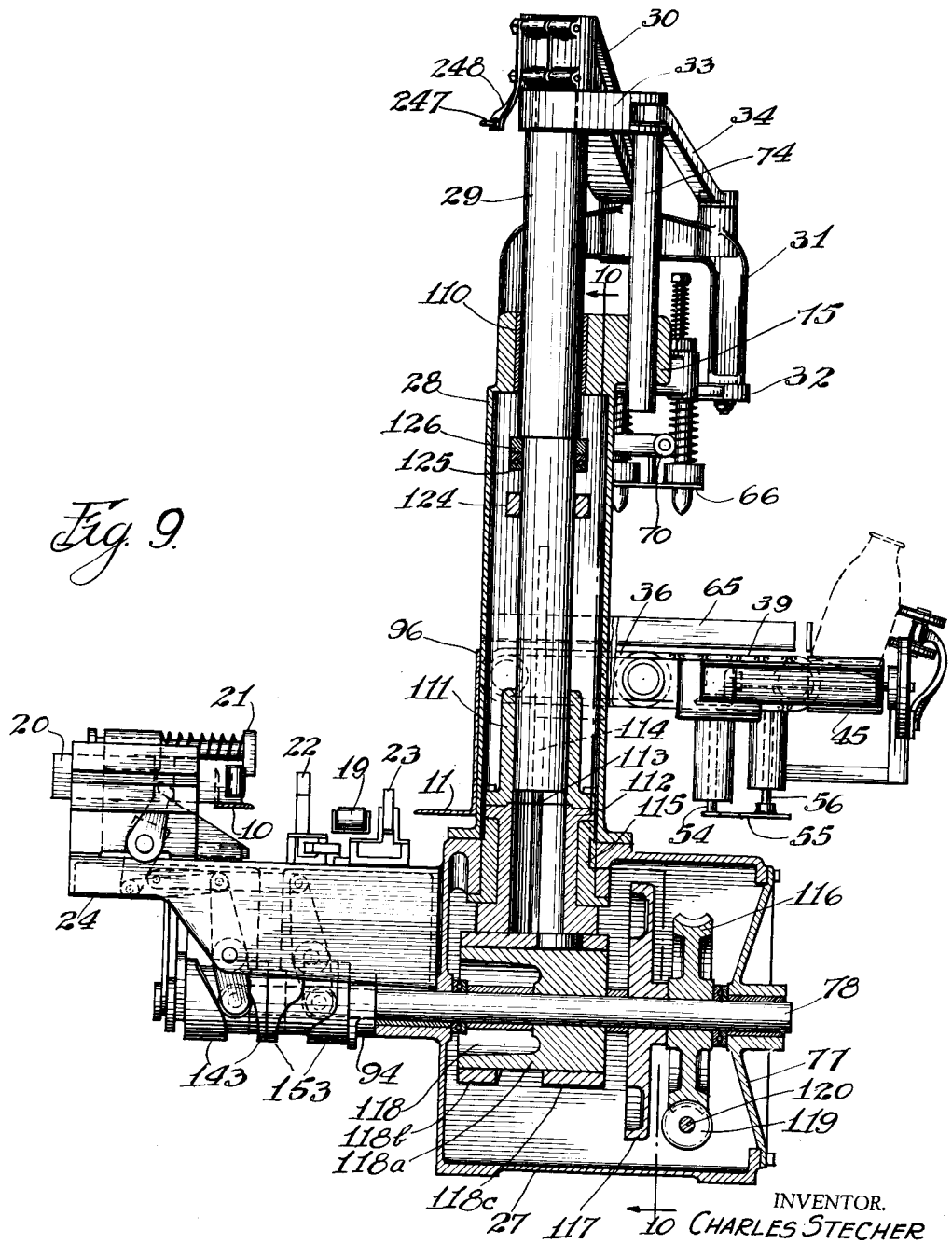

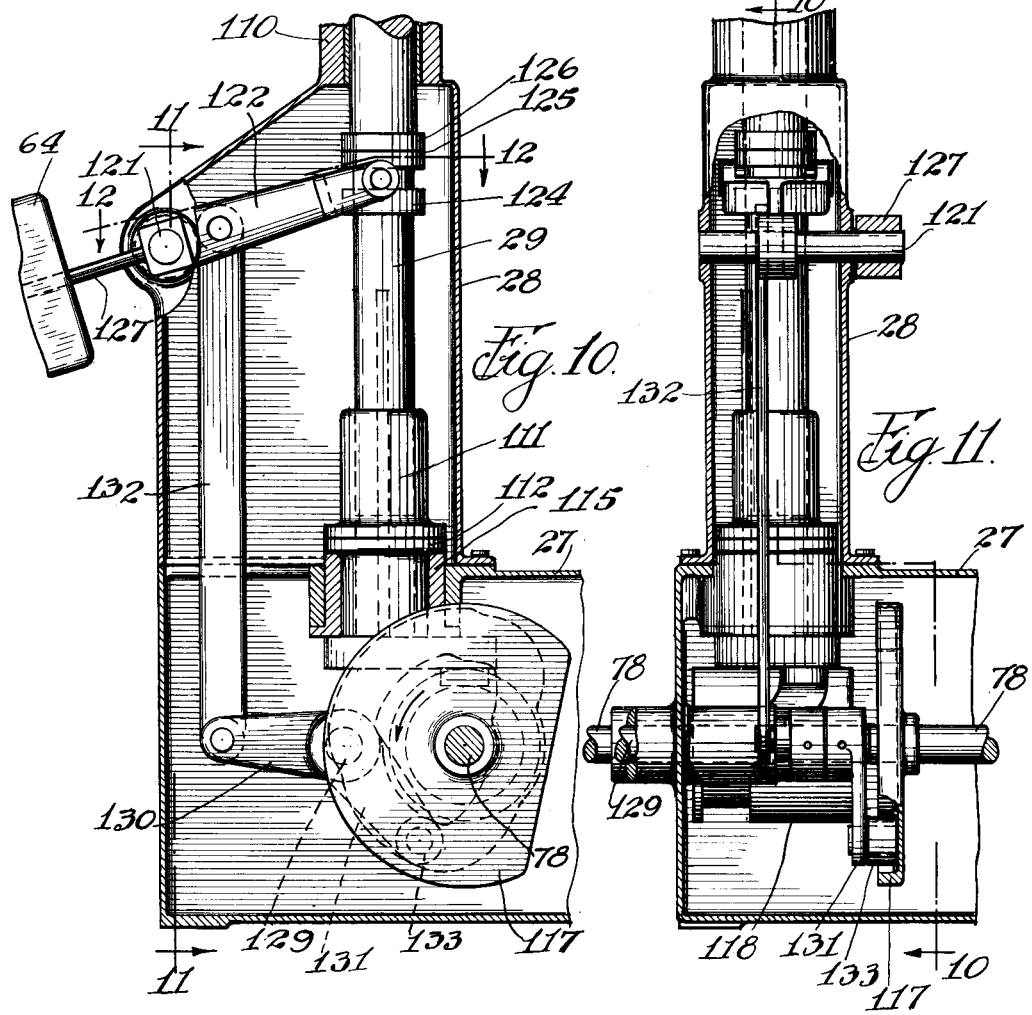
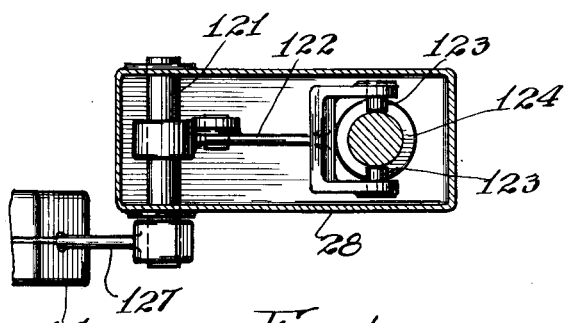

June 7, 1938.  C. STECHER  2,119,725

MACHINE FOR UNLOADING BOTTLES FROM CRATES

Filed Jan. 5, 1935  14 Sheets-Sheet 7

INVENTOR.
CHARLES STECHER.
BY Albert C. Bell
ATTORNEY.

June 7, 1938.
C. STECHER
2,119,725
MACHINE FOR UNLOADING BOTTLES FROM CRATES
Filed Jan. 5, 1935 14 Sheets-Sheet 8
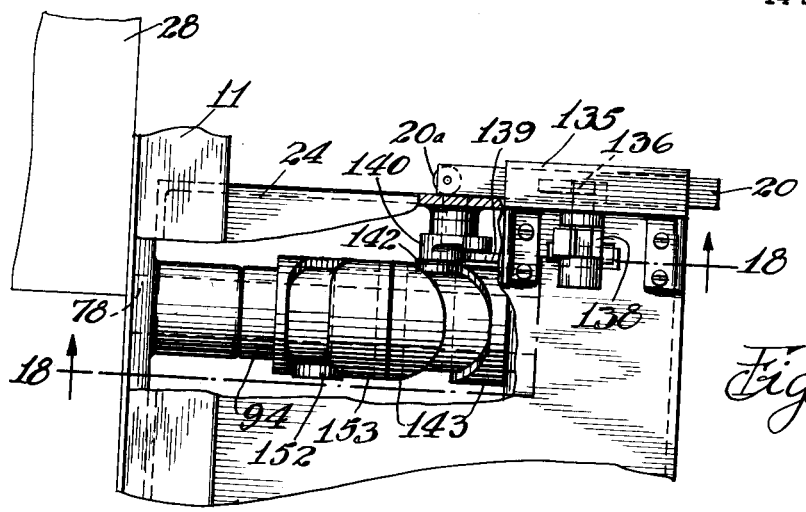
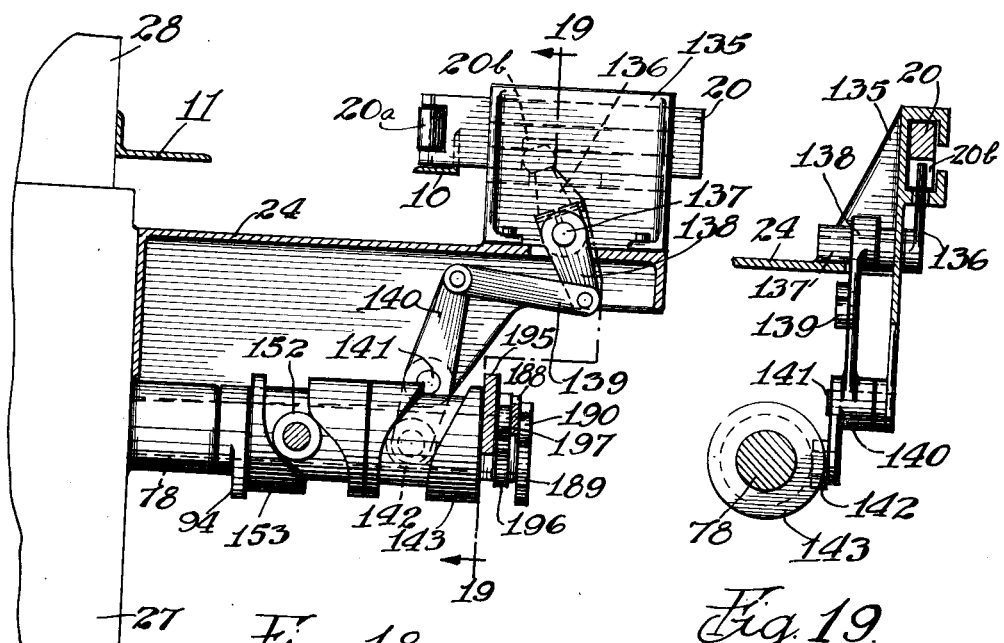
INVENTOR.
CHARLES STECHER.
BY Albert C. Bell
ATTORNEY.

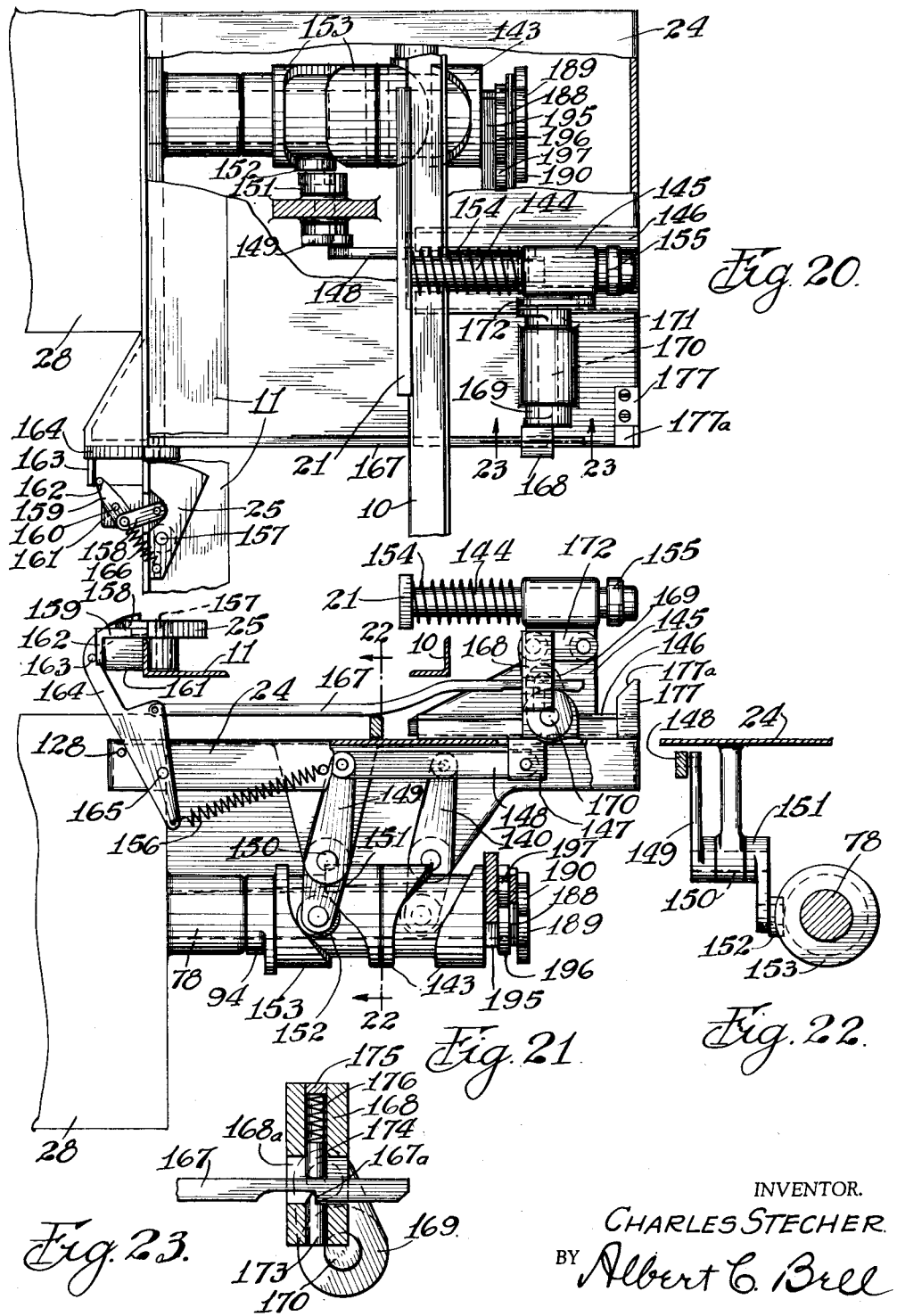

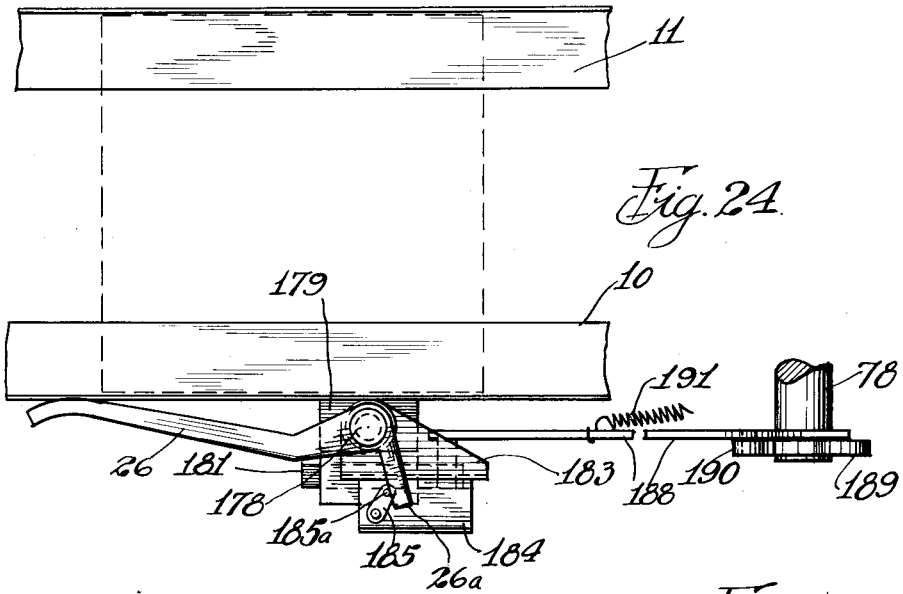
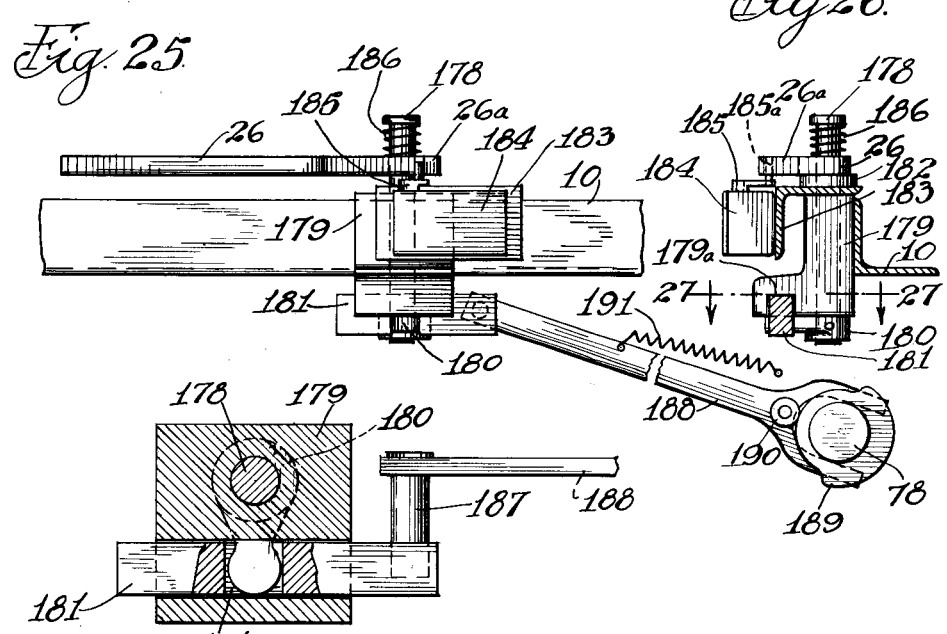

June 7, 1938.　　　　C. STECHER　　　　2,119,725
MACHINE FOR UNLOADING BOTTLES FROM CRATES
Filed Jan. 5, 1935　　　14 Sheets-Sheet 11
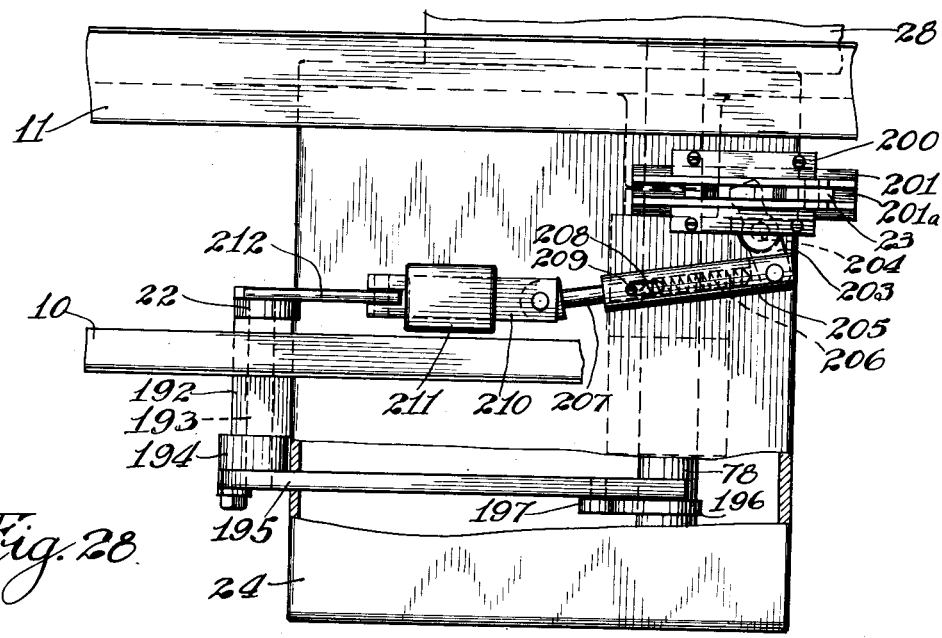
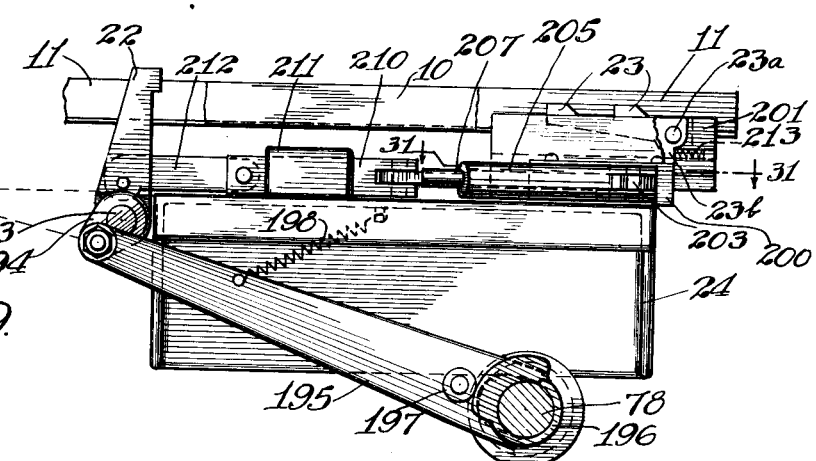
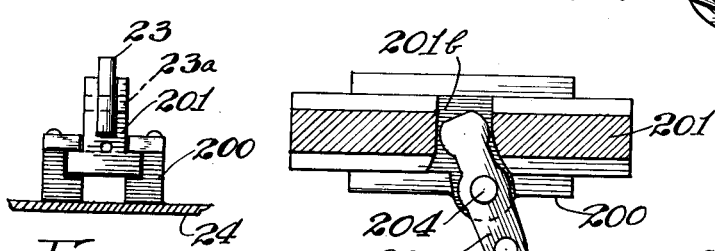
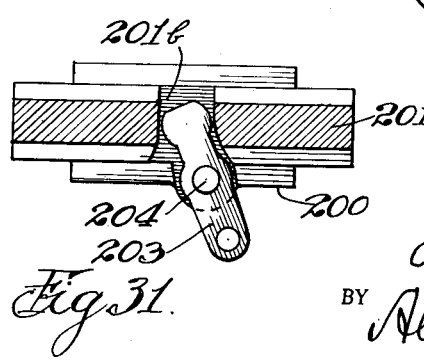
INVENTOR.
CHARLES STECHER.
BY Albert C. Bell
ATTORNEY.

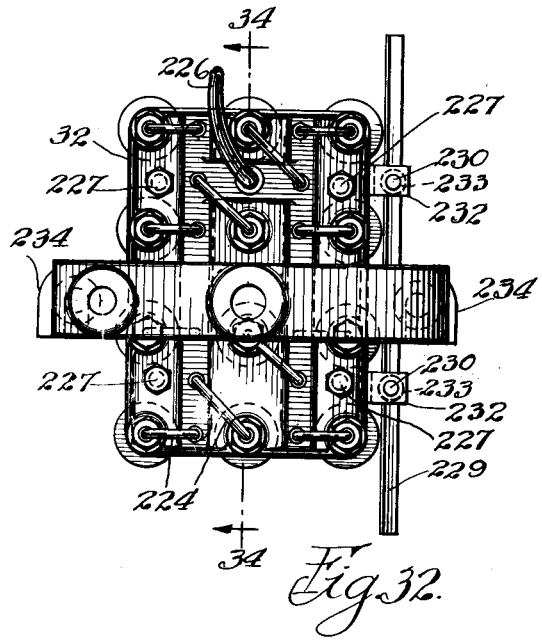
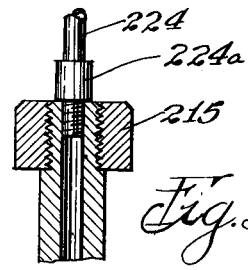
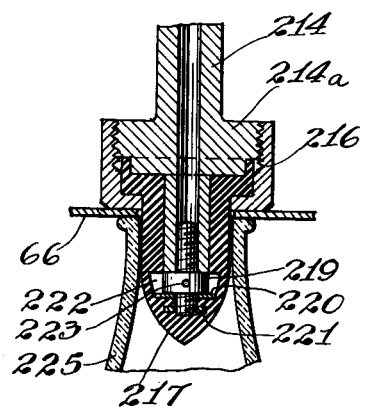
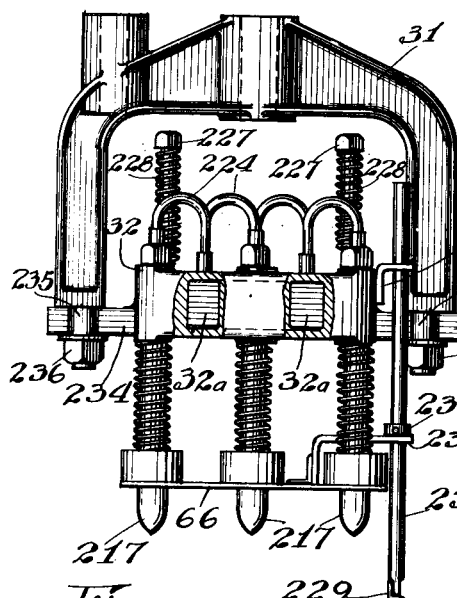
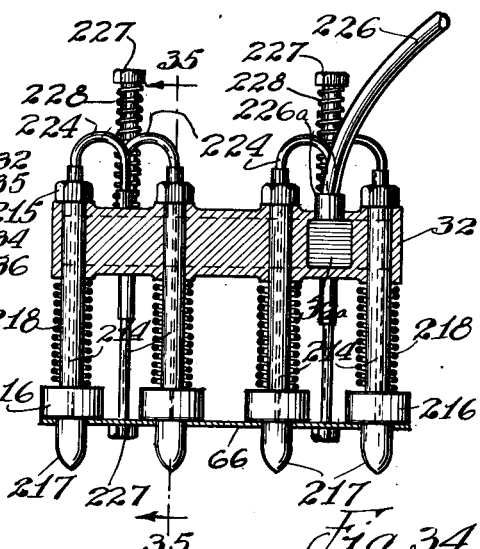

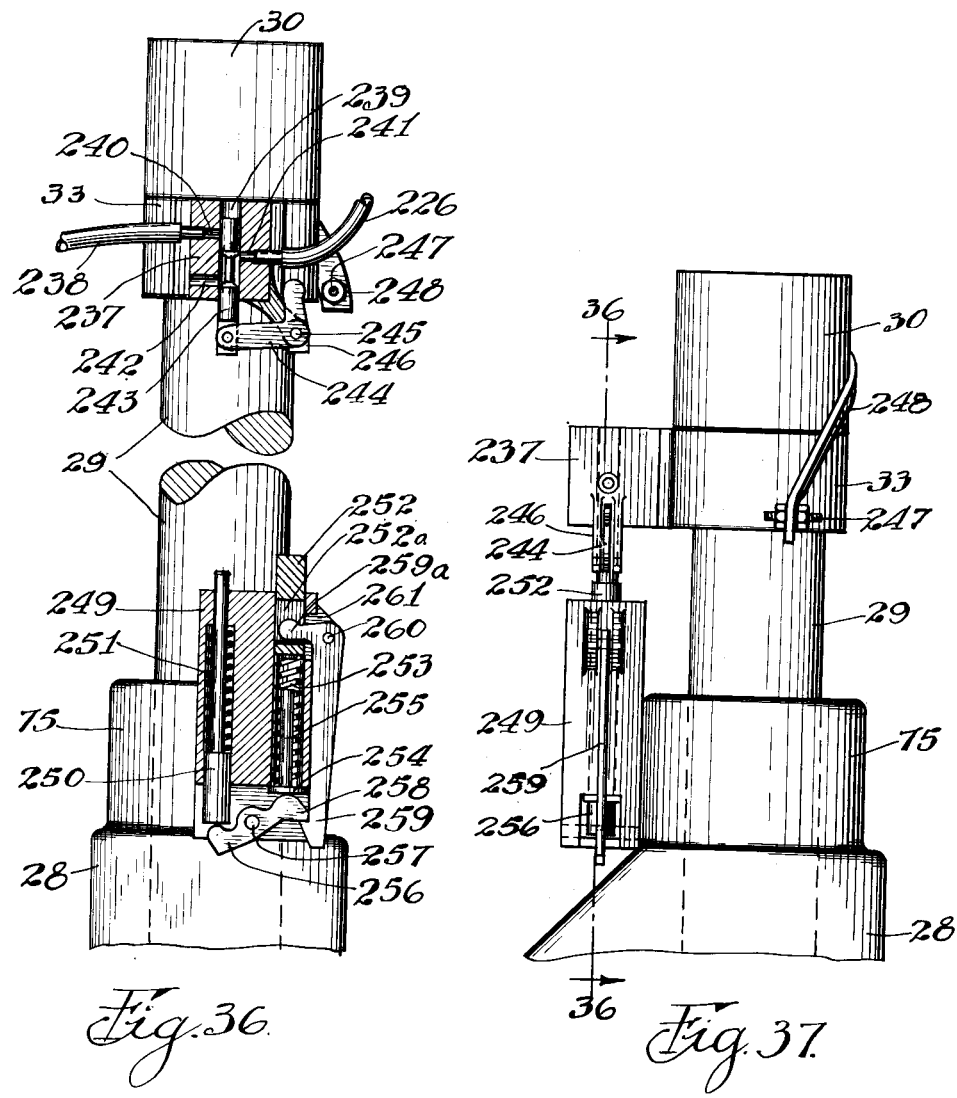

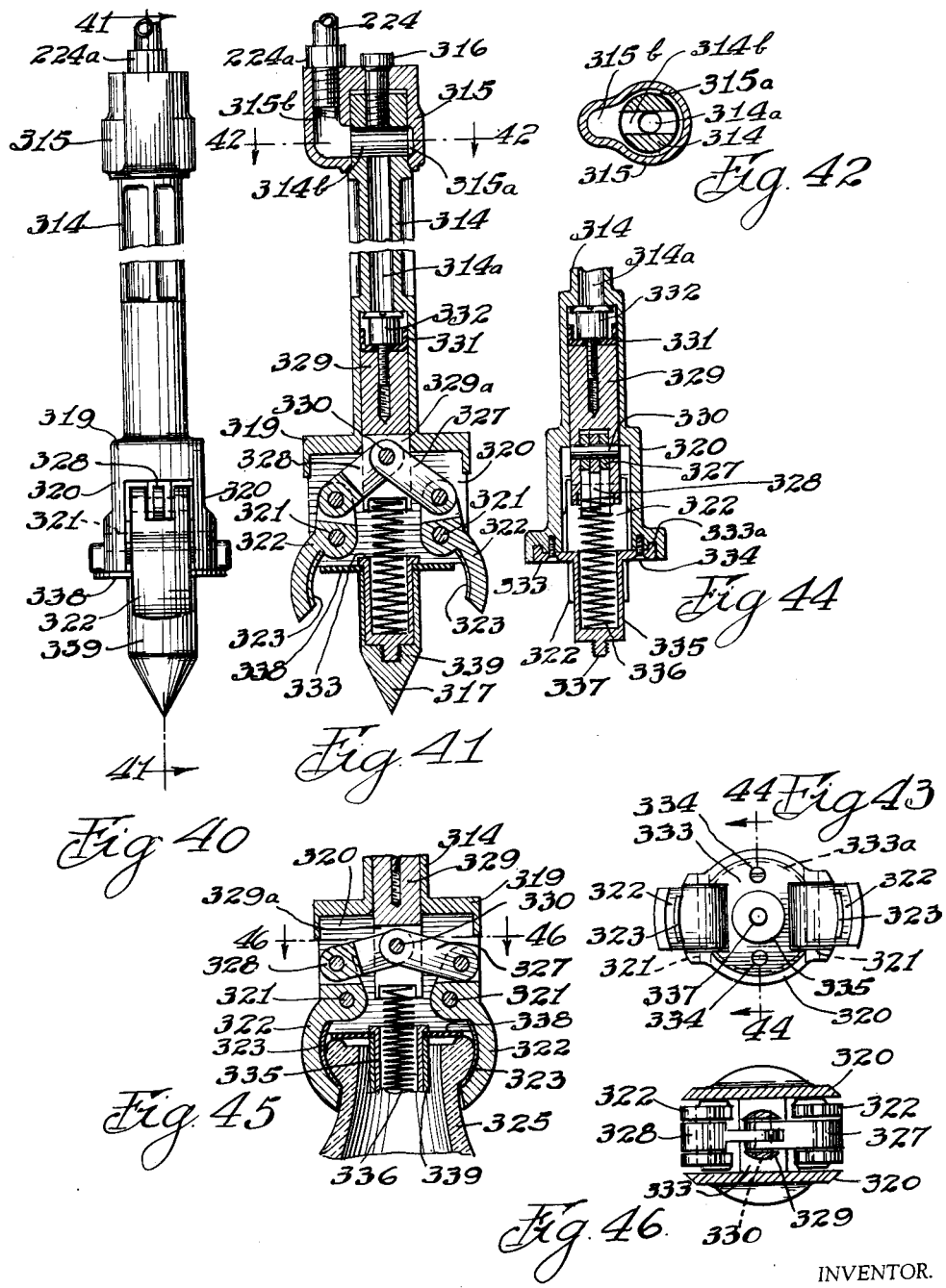

Patented June 7, 1938

2,119,725

UNITED STATES PATENT OFFICE 2,119,725

MACHINE FOR UNLOADING BOTTLES FROM CRATES

Charles Stecher, Chicago, Ill.; Emily M. Stecher executrix of said Charles Stecher, deceased, assignor, by mesne assignments, of one-half to The Charles Stecher Co., a corporation of Illinois, and one-half to Seth L. Winslow, both of Chicago, Ill.

Application January 5, 1935, Serial No. 538

31 Claims. (Cl. 214—1)

My invention consists of a machine for unloading or removing bottles from crates and similar containers, where it is required to handle large numbers of bottles in a short time, for example, in removing empty bottles from crates in dairies.

Heretofore, as far as I am aware, no mechanism has been proposed or used for removing bottles from crates and similar containers, and where this is done manually, for example, in removing empty bottles from crates in dairies, the work is so laborious on account of the rate at which the crates must be emptied to maintain an adequate supply of bottles for the bottle washing machines, that the labor cost is high as a result of it being necessary to frequently relieve the men engaged in this work. It is a purpose of my invention to entirely obviate the necessity of handling bottles manually, in unloading crates containing them, and to accomplish all of the operations involved in removing the bottles, automatically and at a rapid rate, at the same time avoiding breakage of the bottles.

My improved crate unloading machine includes mechanism for use in connection with a crate runway or conveyor of the kind ordinarily empolyed where large quantities of crated bottles must be handled, by which the crates one after another are brought to unloading position and momentarily held in that position, and during the interval that each crate is at rest, other parts of the machine move into engagement with the bottles in the crate, then move away from the crate with the bottles being unloaded from the crate, after which the bottle handling mechanism of the machine carries the bottles onto a receiving table where they are deposited and the bottle handling devices are released and removed from the bottles and are free to move towards the next crate brought to its unloading position, the bottles on the receiving table being at the same time moved from it by suitable conveyors arranged so that the bottles are delivered from the unloading machine in a single row, to the end that they may effectively be fed to any desired mechanism, for example a bottle washing machine. In my machine described, I also provide devices for squaring the crates in their unloading position, if they happen to be deformed, so that the bottles in the crates will not stick or jam in their crate compartments. I also provide safety devices so that if, for any reason, the bottles are stuck in a crate and the entire crate begins to lift from its unloading position, or if the unloaded crates jam in the crate delivery runway, so that it might be impossible to properly locate succeeding crates in their unloading position, the driving mechanism of the unloading machine is stopped until the crate or crates causing the difficulty have been removed.

Figure 15:
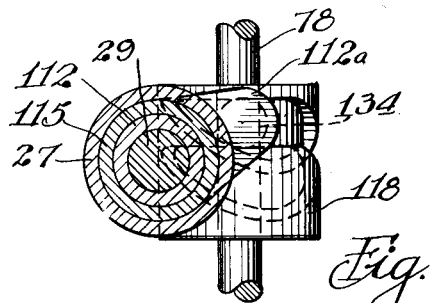
Figure 13:
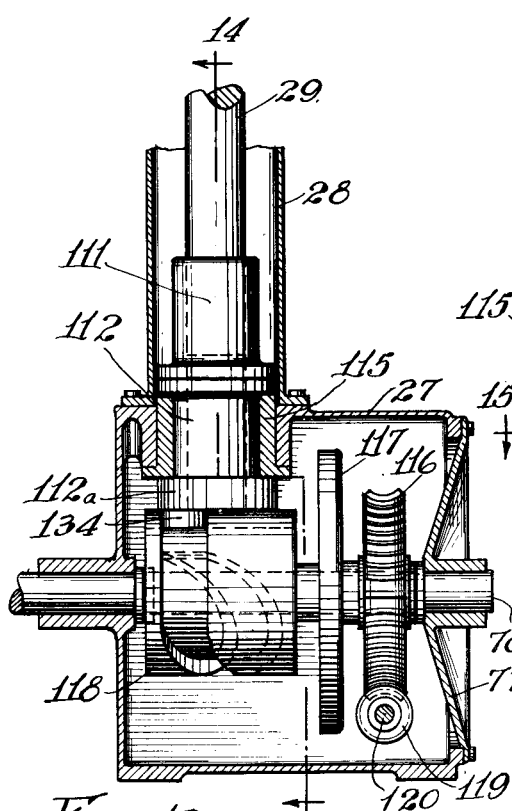
Figure 14:
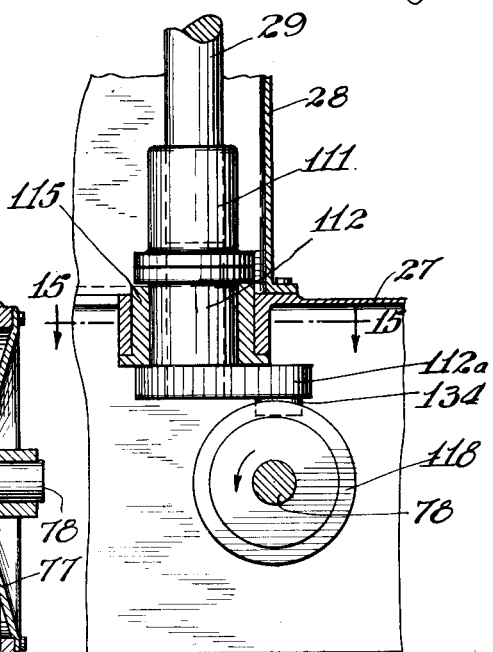
Figure 16:
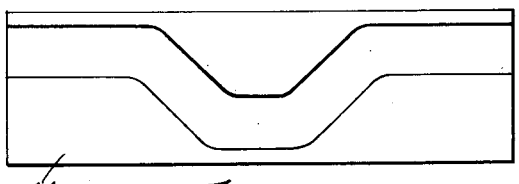

My invention will be best understood by reference to the accompanying drawings illustrating a preferred embodiment thereof, in which Fig. 1 shows my machine in plan view, Fig. 2 is a side elevation of my machine, to a smaller scale than that used in Fig. 1, Fig. 3 is a side elevation of my machine showing the opposite side thereof to that illustrated in Fig. 2, and to substantially the same scale as that used in Fig. 2, Fig. 4 is a plan view to a larger scale than that used in Fig. 1, of the table employed to receive the bottles from the crates, Fig. 5 is a horizontal sectional view of the parts shown in Fig. 4, taken along the line 5—5, Fig. 6 is a vertical sectional view of a part of the construction shown in Fig. 4, taken along the line 6—6, Fig. 7 is a vertical sectional view of the structure shown in Fig. 6 to an enlarged scale, taken along the line 7—7, Fig. 8 is a vertical sectional view of a part of the structure shown in Fig. 6, taken along the line 8—8, Fig. 9 is a vertical sectional view to an enlarged scale of the structure shown in Fig. 3, taken along the line 9—9, Fig. 10 is a vertical sectional view of a part of the construction shown in Fig. 9, taken along the line 10—10 in Figs. 9 and 11, and illustrates the mechanism employed to raise and lower the column of the machine, Fig. 11 is a vertical sectional view of the parts shown in Fig. 10, taken along the line 11—11, Fig. 12 is a horizontal sectional view of the construction shown in Fig. 10, taken along the line 12—12, Fig. 13 shows in a view similar to Fig. 11, the mechanism employed to turn the column of the machine, Fig. 14 is a vertical sectional view of the parts shown in Fig. 13, taken along the line 14—14, Fig. 15 is a horizontal sectional view of the parts shown in Fig. 14, taken along the line 15—15, Fig. 16 is a developed view of the surface of the cylindrical cam illustrated in Figs. 13, 14 and 15, Fig. 17 is a plan view of a part of the structure illustrated in Fig. 1 to an enlarged scale, to show the devices employed for releasing the loaded crates one after another, from a fixed stop in the crate runway, a part of the supporting bracket being broken away in this figure, to more clearly show the construction and relation of the parts.

Fig. 18 is a horizontal sectional view of the parts shown in Fig. 17, taken along the line 18—18, Fig. 19 is a vertical sectional view of the parts shown in Fig. 18, taken along the line 19—19, Fig. 20 shows in plan view to an enlarged scale, the part of the construction illustrated in Fig. 1 which is employed to clamp and hold a crate in unloading position, Fig. 21 is a lower end view of the parts shown in Fig. 20, Fig. 22 is a vertical sectional view of a part of the construction illustrated in Fig. 21, taken along the line 22—22, Fig. 23 is a horizontal sectional view of a part of the construction shown in Fig. 20, taken along the line 23—23, Fig. 24 illustrates in plan view to an enlarged scale, the part of the structure shown in Fig. 1 employed to stop the operation of the machine, if empty crates collect improperly in the delivery runway, Fig. 25 is a side elevation of the parts illustrated in Fig. 24, Fig. 26 is an end elevation of the parts shown in Fig. 25, Fig. 27 is a horizontal sectional view to an enlarged scale, of a part of the construction shown in Fig. 26, taken along the line 27—27, Fig. 28 illustrates to an enlarged scale, the part of the structure shown in Fig. 1, employed to square the crates if they are in deformed condition when placed in unloading position, Fig. 29 is a side elevation of the parts illustrated in Fig. 28, Fig. 30 is a right hand end view of the detent mechanism illustrated in Fig. 29, for engaging one end of a crate in its unloading position, Fig. 31 is a horizontal, sectional view to an enlarged scale, of a part of the structure illustrated in Fig. 29, taken along the line 31—31, Fig. 32 illustrates in plan view to a scale larger than that used in Fig. 1, the head employed for handling one kind of bottles, and also the yoke employed to support the head in the machine, Fig. 33 is an end elevation of the structure illustrated in Fig. 32, Fig. 34 is a vertical, sectional view of the parts illustrated in Fig. 32, taken along the line 34—34, Fig. 35 is a vertical, sectional view to an enlarged scale, through one of the bottle handling tubes illustrated in Fig. 34, this view being taken along the line 35—35 in Fig. 34, Fig. 36 illustrates in front elevation a part of the machine and the associated parts, to show the devices employed for controlling the flow of compressed air to and from the head shown in Figs. 32 and 33 to control the handling of the bottles, this view as to the air controlling devices, being a vertical, sectional view taken along the line 36—36 in Fig. 37, Fig. 37 is a side elevation of the parts shown in Fig. 36, with the difference that in this figure the column is shown in its lower position, whereas in Fig. 36 it is shown in its raised position, Fig. 38 is a horizontal sectional view of a part of the construction shown in Fig. 4, taken along the line 38—38, Fig. 39 is a diagrammatic view illustrating the electrical connections of the machine, Fig. 40 illustrates in side elevation, a modified construction of bottle handling tubes carrying modified bottle engaging and lifting mechanism, Fig. 41 is a vertical, sectional view of the structure shown in Fig. 40, taken along the line 41—41, Fig. 42 is a horizontal, sectional view of a part of the structure shown in Fig. 41, taken along the line 42—42, Fig. 43 is a bottom view of the structure shown in Fig. 41, Fig. 44 is a vertical, sectional view of the structure shown in Fig. 43, taken along the line 44—44, Fig. 45 illustrates in a view similar to Fig. 41, the bottle engaging and lifting mechanism of the latter figure in its bottle engaging position, and Fig. 46 is a horizontal, sectional view of the parts shown in Fig. 45, taken along the line 46—46.

Similar numerals refer to similar parts throughout the several views.

As shown in Fig. 1, I illustrate a runway for crates, which runway consists of angle bars 10 and 11 between which a first conveyor chain 12 is driven by a shaft 13 by means of a belt or chain 14 from a motor 15, the other end of the chain being supported on a pulley or sheave loosely mounted on a second shaft 16. The chain 12 serves to move the crates against a fixed stop 17 carried by the angle bar 10, so that when the crates with the bottles in them, are moved one after another against the stop 17, further movement of the crates by the chain 12 is prevented and the chain slips under the crates without advancing them on the runways. The shaft 16 is driven from the motor 15 by a belt or chain 18, and drives a second conveyor chain 19 extending through the unloading position of the crates, which serves to deliver them to and from their unloading position. A pusher bar 20 is located adjacent the fixed stop 17, to move the crates from engagement with the stop, one after another, so that each of the crates may successively be moved into its unloading position by the chain 19, the bar 20 being reciprocated in a manner to be described, to alternately permit movement of the crates against the stop 17 and to move them laterally from engagement with the stop.

For the unloading position of the crates, a presser plate 21 is provided to hold the crate being unloaded laterally against the angle bar 11, which is offset away from the chain 19 through the crate unloading zone. A swinging stop arm 22 and a movable detent 23 are provided to engage opposite ends of a crate being unloaded, to square the crate, if by chance it is in deformed condition, so that the bottles in the crate will not jam in the bottle compartments in the crate during an unloading operation. The pusher bar 20, the presser plate 21, the arm 22 and the detent 23 are supported on a bracket 24 and are operated by means to be described. The angle bar 11 carries a movable plate stop 25 in line laterally with the stop arm 22, to hold the crate being unloaded in proper position for engagement of the bottles in the crate by the unloading devices, suitable means to be described, being provided for moving the stop 25 and also the stop arm 22 and freeing an unloaded crate, immediately after the unloading operation.

The angle bar 10 supports an oscillatory arm 26 on the discharge portion of the crate runway, to stop the operation of the unloading machine if for any reason, free delivery of the crates after they are unloaded is interfered with, since this might prevent a loaded crate from being properly placed in its unloading position, devices being provided as below described, to oscillate the arm 26 so that it does not interrupt the operation of the unloading machine when the unloaded crates are properly moved from their unloading position, along the delivery portion of the crate runway.

The unloading mechanism is supported by a casing 27 from which a column housing 28 extends upwardly to support a column 29 therein for both vertical and angular movement. An arm 30 is rigidly secured to the upper end of the column 29 and has pivotally secured to its outer end, a depending yoke 31 which carries a head 32 provided with devices for engaging the bottles and lifting them from the crates. The upper end of the column 29 below the arm 30, carries a second arm 33 which moves vertically with the column 29 but is restrained from angular movement by means to be described, and to the outer end of the arm 33, one end of a link 34 is pivotally connected, the other end of which is pivotally connected with the yoke 31. The link 34 and the arm 30 are of the same effective length and are mounted in parallel relation, so that the yoke 31 is maintained at all times in a plane perpendicular to the angle bars 10 and 11, although if preferred, any other desired angle of the yoke 31 relatively to the angle bars 10 and 11 may be similarly maintained by the parallel ruler action of the arm 30 and the link 34, the only requirement being that the structure shall insure a definite position of the head 32 angularly when it is moved over a crate to be unloaded, to the end that the bottle removing devices carried by the head 32 may accurately aline with the bottles in the crate being unloaded, and that the bottles removed from the crate may be deposited in desired position on the receiving table consisting of parallel metal plates 34 supported in a horizontal plane.

The cycle of operation of the head 32 assuming that a loaded crate is held in unloading position by the devices above described, is as follows: the head 32 is first swung over the crate, it is then lowered so that its bottle engaging and lifting devices may engage the bottles in the crate, the head is then raised, lifting the bottles from the crate until they are slightly above the plates 35, the head is then swung over the plates 35, the bottles carried by the head are released and the head is raised sufficiently to clear the bottles, and the operations just described are repeated.

The plates 35 are separated laterally a sufficient amount to receive conveyor chains 36 between them, which chains are supported on suitable wheels carried by shafts 37 and 38, the said wheels carried by the shaft 38 being rigidly secured thereto so that rotation of said shaft may drive the chains. The shaft 38 also carries a second set of wheels between the wheels driving the chains 36, to support second conveyor chains 39 located between horizontal plates 40, the other ends of the chains 39 being supported by suitable wheels secured to and driven by a shaft 41. The shafts 38 and 41 are connected by a driving chain 42 which engages suitable wheels 43 and 44 rigidly secured to said shafts respectively, the wheel 43 being substantially larger than the wheel 44, so that the shaft 41 and the chains 39 driven thereby will have a more rapid movement than the shaft 38 and the chains 36 driven thereby.

A conveyor 45 is disposed adjacent to and transversely of the delivery ends of the chains 39 to receive bottles from them and move said bottles from alignment with the chains 39 and the plates 40 with sufficient rapidity so that each row of bottles delivered to the conveyor 45 is moved from alignment with the plates 40 before the next row of bottles is fed by the chains 39 to the conveyor, and in this way the bottles are delivered by the conveyor 45 from the unloading machine, in a single row, which facilitates properly delivering the bottles to any desired location or other machine, for example to a bottle washing machine. The bottles are usually contained in each of the crates in a plurality of rows, and the head 32 is provided with bottle removing devices which are similarly arranged, and as a result when the bottles are deposited upon the plates 35, they are in the same relation that they had to each other in the crate. When the bottles are deposited on the plates 35 and released, so that they may be moved by the chains 36, they are moved at a relatively slow speed towards the chains 39, and as each row of bottles is engaged by the chains 39, said row is moved rapidly from the next succeeding row of bottles on the plates 35, to sufficiently space the rows delivered by the chains 39 to the conveyor 45, so that each row is moved from alignment with the plates 40, before the next row is moved by the chains 39 onto the conveyor 45.

One end of the conveyor 45 is mounted on and driven by a shaft 46 and supported in any convenient manner not shown, for movement as described, the other end portion of the conveyor being broken away, since it may extend to any desired point remote from the unloading machine. To insure proper delivery of the bottles to the conveyor 45 with the relatively rapid movement of the conveyor found desirable to handle the bottles quickly, the portion of the conveyor 45 in alignment with the plates 40 is preferably depressed at its outer edge, for example, by rollers 45a, towards the guide belts 47 supported by suitable wheels on the shafts 48 and 49, to prevent tipping of the bottles to undesired positions when they are moved onto the conveyor 45.

The shaft 46 is driven by a belt or chain 50 connecting suitable wheels on said shaft and on the shaft 51 of speed reducing gearing driven by a motor 52. The shaft 46 also drives by means of bevel gears 53, a vertical shaft 54 connected by a belt or chain 55 with a second vertical shaft 56, which shaft is connected by suitable gearing 57 with the shaft 41 to drive the latter and thereby to also drive the shaft 38. The shafts 56 and 48 are connected by a belt or chain 58 as more clearly shown in Fig. 38, rollers 58a being illustrated in the latter figure to change the direction of the belt or chain 58 on account of the shaft 48 being in inclined position, by which the belts 47 are moved at substantially the same speed as the conveyor 45. A guide plate 59 is preferably provided in vertical position near the outermost ones of the chains 36 and 39 to guide the outermost bottles being moved on the plates 35 and 40, and the upper end of the shaft 56 preferably carries a wheel 60 to assist in directing the bottles from the plates 40 to the conveyor 45, and from the inclined portion of said conveyor to its horizontal portion.

The casing 27 supports gear reducing mechanism 61 driven by a motor 62, which gear mechanism is preferably of any well known variable ratio type, so that the crate handling devices and the bottle removing mechanism may be driven at a desired speed, corresponding to the adjustment of the arm 63 of the gear mechanism, as will more fully appear below. A counterweight 64 is provided to counterbalance the column 29 and the parts carried thereby.

The vertical relation of the parts above described will more fully appear by reference to Figs. 2 and 3.

As shown in Fig. 2, the column housing 28 supports a guide bar 65 parallel with the guide plate 59, to guide and direct the bottles nearest the column housing as they move over the plates 35. The head 32 is preferably provided with a stripper plate 66 having oppositely extending arms 67 and 68 carrying rollers 69 and 70 for engagement beneath fixed bars 71 and 72, to positively remove the bottles from the bottle engaging devices when the head 32 is lifted to clear the bottles after depositing them on the plates 35.

As shown in Fig. 2, the crate runway is supported by a suitable framework carrying idler rollers 73, 73 for supporting the lower run of the conveyor chain 19, not shown in this figure, where it passes under the bracket 24.

As shown in Fig. 3, a rod 74 extends vertically with a sliding fit through a portion 75 extending laterally from the upper end of the column housing 28, the upper end of said rod 74 being rigidly secured to the arm 33 to restrain said arm from angular movement and at the same time not interfering with vertical movement of the arm 33 with the column 29. The column housing 28 is preferably provided with a removable plate 76 to permit access to the mechanism within said housing as desired. The casing 27 is provided with a removable plate 77 supporting one end of a cam shaft 78 and permitting convenient access to the inside of the casing 27 when desired, and also facilitating the assembly and removal of the parts in the casing.

As shown in Figs. 4 and 5, each of the plates 35 is provided with downwardly extending pins 79, which extend with a sliding fit through the base plate 81 supporting the plates 35 and carry below said base plate, springs 80 secured to the lower ends of said pins. As a result of this construction, the plates 35 tend to move downwardly to rest upon the base plate 81, unless prevented from doing so. In their lowermost position, the upper surfaces of the plates 35 are slightly lower than the upper surfaces of the chains 36, for which position the chains move bottles resting on them, towards the chains 39. When the bottles are deposited on the plates 35 by the head 32, it is desirable that there shall be no movement of the bottles by the chains 36, until the bottle engaging mechanism carried by the head is released from the bottles, and this is effected as follows. Cam rods 82 are mounted for angular movement, transversely of the plates 35 and immediately below them in recesses provided therefor in the base plate 81, said cam rods being preferably cylindrical members each having a flat surface extending throughout its length, so that for one position angularly of the cam rod it will slightly clear the under surfaces of the plates 35 when they are resting upon the base plate 81, and for the alternate position of said cam rod, the plates 35 will be raised from the base plate 81 against the action of the springs 80, a sufficient amount so that the upper surfaces of the plates 35 will be slightly above the upper surfaces of the chains 36. The cam rods 82, 82 are provided with downwardly extending arms 83, 83a connected by a link 84 so that the cam rods may be operated simultaneously. The arm 83a is extended below the lowermost part of the chains 36, and is connected at its lower end by a link 85 with a bell crank lever 86 pivotally supported at 87 on a bracket 88 carried by the casing 27, the other end of the bell crank lever being pivotally connected with a link 89, the other end of which is pivotally connected with a lever 90, said lever being in turn pivotally supported at 91 by an arm 92 extending downwardly from the bracket 24. The lever 90 carries at its outer end, a roller 93 resting on a cam 94 carried by the cam shaft 78 extended through the casing 27. As a result of this construction, rotation of the cam shaft 78 in a manner to be described, periodically turns the cam rods 82, 82 a sufficient amount to raise the plates 35 slightly above the tops of the chains 36, which condition occurs at the time the bottles are deposited on the plates 35 by the head 32, and continues until the head has been raised to entirely clear the devices carried by the head, from the bottles, after which the cam rods 82, 82 are at once turned to their alternate position permitting the plates 35 to rest upon the base plate 81, and movement of the bottles by the chains 36 towards the chains 39 is at once begun. A spring 95 is preferably provided between the bell crank lever 86 and the housing 28, to hold the cam rods 82, 82 in their position permitting the plates 35 to occupy their lowermost position, when the cam rods 82, 82 are not operated by the cam 94. As shown in Fig. 5, the column housing 28 is provided with a plate 96 above the angle bar 11, for the crates to rest against, when they are in their unloading position.

Notwithstanding the operation of the crate squaring devices referred to, it sometimes occurs that the bottles will stick in a crate being unloaded and tend to lift the entire crate. To guard against this and the damage that might result, I provide the safety devices illustrated in Figs. 6, 7 and 8. Back of the angle bar 11 I locate brackets 97 carried by said angle bar as illustrated in Fig. 7, to loosely support the inner ends of rods 98 which carry at their outer ends, blocks 99 extending outwardly beyond the plate 96 through suitable apertures therefor in said plate and resting on the angle bar 11, the outer faces of said blocks being preferably knurled or roughened to positively engage the side of the crate coming into contact with them when the crate is pressed against the plate 96 by the presser plate 21. Each of the rods 98 has rigidly secured to is midportion, a collar 100 between which and the corresponding bracket 97, a spring 101 is disposed tending to move the corresponding block 99 outwardly through the plate 96. Each of the rods 98 has rigidly secured thereto adjacent its inner end and inside of the bracket 97, a second collar 102 to limit outward movement of the rod by its spring 101. Each of the collars 100 is pivotally connected with the lower end of a link 103 having pivotal connection at its upper end with a crank 104 carried by a horizontal shaft 105 supported in suitable bearings carried by the plate 96. The midportion of the shaft 105, as shown in Fig. 6, has secured thereto a crank arm 106 which, as more clearly shown in Fig. 8, carries a rod 107 projecting downwardly therefrom and in line with the operating button 108 of an electric switch 109 carried by the plate 96, which switch, as will be described, is constructed to open the circuit controlled by it when its operating button is depressed and to close said circuit when its operating button is released. As a result of this construction, when a crate is pushed against the plate 96 by the presser plate 21, the rods 98 move inwardly under the yielding action of the springs 101 until the crate is in engagement with the plate 96 and where the bottles are easily removed from the crate, no further action of the rods 98 and the parts controlled thereby, results. When however, the bottles stick in the crate and the entire crate lifts with the bottles, the heads 99 are moved upwardly by their engagement with the crate, thereby turning the shaft 105 sufficiently to depress the button 108 of the switch 109, to open the circuit of the motor 62 in a manner to be described, thereby stopping the operation of the head 32 until the difficulty is rectified.

As shown in Fig. 9, the column 29 is mounted for vertical and angular movement in an upper bearing 110 carried by the column housing 28, and at its lower end said column is mounted for sliding movement vertically in a sleeve comprising an upper portion 111 and a lower portion 112, which sleeve portions are rigidly secured together to constitute in effect, a single sleeve provided with a longitudinal keyway 113 engaging with a sliding fit a key 114 carried by the lower end of the column 29. The sleeve member 112 is mounted for angular movement in a bearing 115 carried by the casing 27, said sleeve member 112 being provided with flanges adjacent the ends of said bearing to prevent longitudinal movement of the sleeve member in the bearing.

The cam shaft 78 extends through the casing 27 as indicated, having one bearing in the cover plate 77 and another bearing in the opposite side wall of the casing, and within the casing said shaft has rigidly secured thereto, a worm wheel 116, a column lifting cam 117 and a column turning cam 118, the latter cam being preferably built up of a core 118a and two tubular members 118b and 118c of hardened steel, rigidly secured to the core member 118a. The members 118b and 118c are spaced from each other and are provided with cam surfaces on their adjacent edges, since the cam is of the barrel type, while the column lifting cam 117 is of the disk type. Suitable ball bearings are provided on the shaft 78 within the casing 27, to withstand the end thrusts resulting from the operation of the cam 118.

As shown in Fig. 9, the shaft 78 extends under the bracket 24 to carry the cam 94, as well as other cams below described, to operate the crate handling devices.

The worm wheel 116 is engaged by a worm 119 carried by a shaft 120, which extends through the casing 27 to engage gearing of the mechanism 61 illustrated in Fig. 1, so that the cam shaft 78 may be driven by the motor 62 at the speed selected by the adjustment of the arm 63 of the gear changing mechanism.

The arm 33 carrying the rod 74, is a free turning fit on the upper end of the column 29, between a shoulder formed thereon and the hub of the arm 30, which shoulder and hub are closely adjacent the arm 33 to prevent movement of the arm longitudinally on the column 29.

As shown in Figs. 10, 11 and 12, the upper portion of the column housing 28, supports a short horizontal shaft 121 in suitable bearings at one side of the column 29, which shaft has rigidly secured thereto, as more clearly shown in Fig. 12, an arm 122 extending towards the column and having end members extending on opposite sides of the column, and carrying rollers 123, 123 resting between collars 124 and 125 carried by the column. The collar 124 is rigidly secured to the column, and the collar 125 is a part of a thrust ball bearing resting against another collar 126 rigidly secured to the column 29. The shaft 121 extends through the housing 28, and on its outer end has rigidly secured to it, the hub of an arm 127, which arm carries the counterweight 64 to balance a desired part of the weight of the column 29 and of the parts supported thereby.

As shown in Figs. 10 and 11, the casing 27 supports a horizontally disposed shaft 129 parallel with and spaced from the shaft 78, to which shaft 129, arms 130 and 131 are rigidly secured, the arm 130 being pivotally connected at its outer end with a link 132, the other end of which is pivotally connected with the arm 122, while the outer end of the arm 131 carries a roller 133 engaging the cam groove formed in the face of the cam 117. As a result of the construction just described, a desired portion of the weight of the column 29 and of the parts carried thereby, may be counterbalanced by the counterweight 64, and rotation of the cam shaft 78 and of the cam 117 will cause vertical movement of the column 29 and the parts carried thereby, depending upon the shape of the cam groove in the cam 117, which cam groove is continuous so that the rotation of the shaft 78 may be continuous and of any convenient speed depending upon the desired rate of operation of the column 29.

As shown in Figs. 13 and 14, the lower flange of the sleeve member 112 is extended over the cam 118 to form an operating arm 112a, which arm carries a roller 134 engaging the groove in said cam. As a result of this construction, rotation of the cam 118 oscillates the arm 112a and also the sleeve members 111 and 112, thereby imparting coresponding angular movement to the column 29 and the parts carried thereby, regardless of the vertical position of the column resulting from the operation of the cam 117 above described.

The relation of the column 29 to the shaft 78, and the relation of the arm 112a to the cam 118 is more clearly shown in Fig. 15, and the form of the cam groove in the cam 118 to accomplish the desired angular movement of the column 29 and of the parts carried thereby, is more clearly shown in developed view in Fig. 16.

In Figs. 17, 18 and 19, I illustrate the devices employed to operate the push bar 20 to release the crates one at a time from the fixed stop 17 on the angle bar 10 shown in Fig. 1. As shown in Figs. 17-19, the push bar 20 is mounted for longitudinal movement transversely of the angle bar 10, in a guideway 135 carried by the bracket 24, the end of the bar 20 adjacent the angle bar 10 being provided with a roller 20a for engagement with the crate being moved from the stop 17. The lower edge of the bar 20 is notched as indicated at 20b to receive the rounded upper end of an arm 136 carried by a short horizontal shaft 137 supported in suitable bearings carried by the bracket 24. The shaft 137 has also rigidly secured to it, a second arm 138 extending downwardly from the shaft through a clearance opening in the top of the bracket 24, the lower end of said arm being pivotally connected with one end of a link 139, the other end of which link is pivotally connected with the upper end of a bell crank lever 140 pivotally supported on a stud 141 carried by one side wall of the bracket 24. The lower end of the bell crank lever 140 carries a roller 142 which engages the groove in a cylindrical cam 143, carried by the outer end portion of the cam shaft 78 under the bracket 24. As a result of this construction, rotation of the shaft 78 reciprocates the bar 20 in its guideway so that it is in its retracted position permitting a crate to rest against the fixed stop 17, when the crate ahead of it on the crate runway is being unloaded, the cam 143 further serving to move the bar 20 to the position indicated in Figs. 17 and 18 immediately upon the release of the crate just unloaded, to release the next loaded crate so that it may be fed to its unloading position.

In Figs. 20-23 inclusive, I illustrate the devices employed for operating the crate presser plate 21 and the plate stop 25 used to hold the crates in unloading position. As shown in these figures, the presser plate 21 is supported on the end of a horizontal rod 144, mounted for sliding movement transversely of the angle bar 10, in a block 145 having lower flanges for sliding engagement with guideways 146 carried by the bracket 24 and extending transversely of the angle bar 10. The block 145 is provided with an arm 147 extending downwardly through a clearance slot in the top wall of the bracket 24, which arm is pivotally connected with one end of a link 148, the other end of which is pivotally connected with the upper end of an arm 149 rigidly secured to a short horizontal shaft 150 carried by a bearing supported by and below the top of the bracket 24. The other end of the shaft 150 has secured to it a second arm 151 extending below said shaft 150 and carrying a roller 152 in engagement with the groove in a cylindrical cam 153 secured to the shaft 78 below the bracket 24. The cam 153 is constructed to hold the block 145 away from the angle bar 11 during the time that a crate is being moved from the fixed stop 17 to its unloading position, to move the block 145 towards the angle bar 11 immediately after a crate has reached its unloading position, and to hold the crate by means of the presser plate 21, firmly against the angle bar 11 and against the plate 96, while the crate is being unloaded. The rod 144 carries a spring 154 between the plate 21 and the block 145 so that the plate 21 engages a crate in its unloading position, with yielding pressure which compensates for inequalities in the dimensions of the crates and which may also compensate for different sizes of crates if desired. The end of the rod 144 remote from the presser plate 21 is provided with a nut or nuts 155 by which the tension of the spring 154 may be adjusted.

As shown in Figs. 20 and 21, the plate stop 25 is pivotally mounted at 157 in horizontal position on the angle bar 11, at a sufficient height to clear the vertical leg of the angle bar. With the stop in the position shown in Figs. 20 and 21, it is in the path of movement of a crate to its unloading position by the chain 19, so that movement of the crate beyond its unloading position is prevented by said stop. When the crate has been unloaded however, it is necessary to release it from the stop and continue its movement by means of the chain 19, to the discharging portion of the crate runway, and this release is accomplished as follows. The stop 25 is connected by a link 158 with one end of a lever 159 pivotally mounted at 160 on a block 161 back of and supported by the angle bar 11. The other end of the lever 159 has extending downwardly therefrom, a bar 162 in the path of a horizontally disposed bar 163 extending from the upper portion of a hook shaped crate releasing lever 164. The lever 164 is pivotally supported in vertical position at 165 on an edge of the bracket 24 and extends below said bracket and is connected at its lower end, with one end of a spring 156, the other end of which is secured to the bracket 24, to hold the lever 164 in its retracted position indicated in Figs. 20 and 21, unless said lever is moved to release a crate from the stop 25. The hook shaped upper end of the lever 164 extends over the top of the angle bar 11 during a crate releasing operation, to move the crate from engagement with the adjacent edge of the stop 25, which as indicated is preferably rounded to facilitate discharging the crate from engagement with the stop. The pivotal connection of the link 158 with the lever 159 is connected with one end of a spring 166, the other end of said spring being connected with the end of the stop 25 remote from its crate stopping edge. As a result of this construction, when the releasing lever 164 is moved over the angle bar 11 to release a crate that has just been unloaded, the engagement of the bars 162 and 163 moves the lever 159 and link 158 to draw the rounded holding edge of the stop 25 over the top of the angle bar 11 and away from the angle bar 10, which action continues until the upper end of the lever 164 has moved the unloaded crate outwardly beyond the stopping edge of the stop 25. This action however, elongates the spring 166, so that when the lever 164 is again moved to its retracted position, shown in Figs. 20 and 21, the spring 166 moves the stop 25 to its stopping position and also moves the lever 159 so that the bars 162 and 163 remain in engagement with each other.

The lever 164 is pivotally connected above the bracket 24 and below the angle bar 11, with one end of a link 167 which extends under the crate runway and through an operating block 168 pivotally connected with and operated by an arm 169 secured to a short horizontal shaft 170 supported in a suitable bearing carried by the bracket 24. As more clearly shown in Fig. 20, the other end of the shaft 170 has rigidly secured to it a second arm 171 pivotally connected with a link 172, the other end of which is connected to the block 145. As a result of this construction, when the block 145 is moved to its retracted position by the operation of the cam 153, the shaft 170 is oscillated to move the block 168 and the link 167 to the right as shown in Figs. 20 and 21, thereby moving the lever 164 to its crate releasing position. To insure a quick return of the stop 25 to its crate stopping position, and at the same time leave the presser plate 21 in its retracted position to permit the free movement of the next crate to its unloading position, the connection between the link 167 and the block 168 is constructed as more clearly shown in Fig. 23. As shown in that figure, the block 168 is provided with a clearance opening 168a to receive the end portion of the link 167, said clearance opening being substantially larger than the end portion of said link. The lower portion of the clearance opening is provided with a toothed member 173, preferably of hardened steel and having a tooth on its upper end in the clearance opening 168a, to engage a corresponding shoulder 167a formed in the lower edge portion of the link 167. The upper portion of the block 168 is bored to receive a plunger 174 at its inner end, which plunger extends into the opening 168a and against the upper edge of the link 167, the outer end of the bore being closed by a plug 175. Between the plunger 174 and the plug 175, a spring 176 is disposed which exerts a thrust on the plunger 174 towards the link 167, tending to hold the shoulder 167a in engagement with the tooth on the member 173. The link 167 extends beyond the block 168 a short distance to engage the beveled face 177a of a fixed cam member 177 carried by the bracket 24 in the path of the link 167, as more clearly shown in Figs. 20 and 21. As a result of the construction just described, when the shaft 170 is oscillated to move the lever 164 to its crate releasing position, and the block 145 reaches its fully retracted position, the end of the link 167 engages the cam surface 177a and is raised thereby against the action of the spring 176, to release the shoulder 167a from the toothed member 173, at which time the spring 156 moves the lever 164 to its retracted position against a stop pin 128 carried by the bracket 24, at the same time permitting the stop 25 to move to its crate stopping position as described, so that the presser plate 21 may remain in its fully retracted position to permit the next loaded crate to move to its unloading position, with the stop 25 in proper position to limit movement of said crate. When the block 145 is moved towards the crate to be unloaded, the block 168 slides on the link 167 until the toothed member 173 again engages the shoulder 167a, so that the next retracting movement of the block 145 will again operate the link 167 as described.

It will be observed that as a result of each crate being held against movement during the unloading of the bottles contained in the crate, and as a result of an appreciable though small time interval being involved in unloading the bottles from a crate so held in unloading position, during the normal operation of the machine and the proper discharge of the unloaded crates by the crate runway, there will be a substantial spacing between successive unloaded crates delivered to the crate runway from the unloading mechanism. It sometimes occurs, however, through no fault of the crate unloading mechanism, that the normal delivery of the unloaded crates by the crate runway is interfered with for one reason or another, and that the unloaded crates are not promptly handled and delivered by the delivery portion of the crate runway. Since this condition may develop under some circumstances to a degree to interfere with leaving the crate unloading position clear for the next loaded crate, and so result in damage either to the unloading mechanism, or to the bottles in the crate to be next unloaded, or both, I provide the safety mechanism illustrated in Figs. 24 to 27 inclusive and consisting in part of the controlling arm 26 referred to in connection with Fig. 1. As shown in Figs. 24 and 25, the arm 26 is mounted adjacent the angle bar 10 in a horizontal plane on a vertical rod 178. As more clearly shown in Fig. 26, the rod 178 is supported in a bearing block 179 rigidly secured to the angle bar 10, and has an arm 180 rigidly secured to its lower end. The lower portion of the bearing block 179 is provided with a groove 179a to hold and guide a bar 181 for reciprocal movement substantially parallel with the angle bar 10. As shown in Fig. 27, the lower portion of the bar 181 in the mid portion of the block 179, is recessed at 181a to contain the rounded end of the arm 180, so that reciprocation of the bar 181 in the block 179 will oscillate the arm 180 and the shaft 178, the arm 180 at the same time serving to hold the bar 181 in place in the groove 179a.

The upper portion of the rod 178 just above the block 179, has rigidly secured to it a collar 182 which is in turn rigidly secured to a bracket 183 carrying an electrical switch box 184, which switch box is provided with an external operating arm 185 so arranged that movement of the arm 185 relatively to the switch box 184, will open or close the switch contacts in the box 184, depending upon the direction of movement of the arm relatively to the switch box. The arm 185 is provided at its end with a pin 185a extending into alignment with a member 26a extending laterally from the pivotal portion of the arm 26. The upper end of the rod 178 is provided with a head spaced a substantial distance from the arm 26, and the arm 26 is a free turning fit on the rod 178. Between the head on the rod 178 and the arm 26, a spring 186 is disposed around the rod 178 with its ends secured to the rod and to the arm 26 respectively, and in such relation that the action of said spring holds the arm 26 against the collar 182, and also holds the member 26a of the arm 26, against the pin 185a with sufficient pressure to hold the arm 185 in a position to close the electrical contacts in the switch box 184 against the action of a spring in said switch box, tending to open said contacts.

The bar 181 is connected at one end with a stud 187, the other end of which is connected with a link 188 extending to the cam shaft 78 below the bracket 24, where the link is widened and slotted to lay upon opposite sides of the shaft 78 and ride thereon. The shaft 78 has rigidly secured thereto, adjacent to the link 188, a cam 189 upon the outer cam surface of which, a roller 190 carried by the link 188, rides. The link 188 is connected with one end of a spring 191 holding the roller 190 against the cam 189, the other end of said spring being connected with any suitable fixed support, for example, the bracket 24.

As a result of the construction described, rotation of the cam shaft 78 periodically reciprocates the bar 181, and oscillates the rod 178.

The cams carried by the shaft 78 provide for one complete cycle of operation of the unloading machine for each rotation of the cam shaft, and hence a complete oscillation is imparted to the rod 178 for each unloaded crate delivered from the unloading machine to the crate runway. Each oscillation of the rod 178 oscillates the bracket 183, the switch box 184 and the arm 26, without relative movement of any kind between these parts, assuming that the spacing of the crates received by the delivery portion of the crate runway is the normal spacing resulting from the time consumed in unloading each crate, since the cam 189 is adjusted on the cam shaft 78, so that each oscillatory movement swinging the arm 26 over the angle bar 10 and into the path of the empty crates moving on the delivery portion of the crate runway, occurs at a time when there is no empty crate in the path of the moving arm 26, or in other words, the cam 189 is so timed that the said movements of the arm 26 are synchronized with the spaces between the empty crates. When, however, for any reason the normal spacing between the empty crates is not maintained, and the empty crates clog in the runway, a crate in the path of the arm 26 prevents its oscillatory movement with the rod 178 as described, when the bracket 183 and the switch box 184 are oscillated as described by the cam 189. This produces movement of the switch box 184 relatively to the arm 26 and permits the switch arm 185 to move relatively to the switch box 184 under the action of the spring not shown, contained in the switch box, and the electric contacts in the switch box are thereby separated from each other to open the electric circuit connected with said electric contacts, which circuit extends to the motor controlling the operation of the cam shaft 78, as illustrated diagrammatically in Fig. 39. This stops the operation of the crate unloading devices until the jam in the delivery portion of the crate runway is relieved, and then the mechanism may again function.

In unloading crates of the kind referred to, it happens from time to time that some of the crates are deformed from their proper shape which is rectangular or square, which deformed condition tends to bind the bottles in the compartments provided therefor in the crates. To avoid the sticking of the bottles in such crates, I provide crate squaring devices for acting upon the crates in their unloading position, as shown in Figs. 28 to 31 inclusive. As illustrated in these figures, one edge of the bracket 24 has secured thereto a bearing 192 extending horizontally under the angle bar 10, to support a short horizontal shaft 193 transversely of the angle bar 10, for oscillatory movement in said bearing. The outer end of said shaft 193 has rigidly secured thereto a downwardly extending arm 194, which is pivotally connected with a link 195 extending under the bracket 24 towards the cam shaft 78. At the shaft 78, the link 195 is widened and provided with an end slot so that the link may engage opposite sides of the shaft 78 and be guided thereby. Adjacent the link 195, the shaft 78 has rigidly secured thereto a cam 196 upon which a roller 197 carried by the link 195, rests. A spring 198 has its ends connected respectively with the link 195 and the bracket 24 to hold the roller 197 in engagement with the cam 196. The shaft 193 has rigidly secured to its other end just inside of the angle bar 10, the swinging stop arm 22 referred to above in connection with Fig. 1, which stop arm for one position of the cam 196 occupies a vertical position as illustrated in Fig. 29, said arm 22 being moved by the spring 198 to the position indicated in dotted lines at 22a for the alternate position of the cam 196, the latter position of the arm 22 being below the path of travel of crates on the crate runway above the shaft 193. When the arm 22 is in its vertical position shown in Fig. 29, its upper end is in the path of travel of crates on the crate runway, and serves as a crate stop co-operating with the stop plate 25, to hold the crates one after another in unloading position, the crate stopping surfaces of the stop 25 and of the arm 22 being in a horizontal line extending substantially at right angles to the surface of the plate 96 against which each crate is pressed by the presser plate 21, when said crate is in its unloading position. It will be observed that when the arm 22 is in its vertical position, it is positively held in such position by the action of the cam 196, so that it constitutes a positive stop for the crates, just inside of the angle bar 10.

Just inside of the angle bar 11, and adjacent the edge of the bracket 24 remote from the bearing 192, said bracket 24 supports on its upper surface a guideway 200 extending substantially parallel with the angle bar 11, to support a block 201 for horizontal reciprocal movement therein. The block 201 is slotted in its upper portion as indicated at 201a, and has pivotally mounted in said slot, a detent 23 having a plurality of teeth on its upper edge for engagement with a crate in its unloading position. A lever 203 is pivotally mounted on the lower portion of the guideway 200 at 204, one end of said lever being rounded and engaging the block 201 to reciprocate it, and the other end of said lever being pivotally connected with a link 205. The link 205 is tubular excepting at its end connected with the lever 203, and contains a compression spring 206, one end of which rests against the inner end of the bore in the link, the other end of said spring being engaged by the inner end of a rod 207 extending from the bore in said link. Adjacent the inner end of the rod 207, the link 205 is slotted as shown at 208, and in said slot, a pin 209 projecting from the rod 207 and rigidly carried thereby, is located. The other end of the rod 207 is pivotally connected with a horizontal bar 210 mounted for sliding movement substantially parallel with the angle bar 10, in a guideway 211 secured to the bracket 24. The other end of the bar 210 is pivotally connected with one end of a link 212, the other end of which is pivotally connected with the arm 22. As a result of the construction just described, when the arm 22 is moved to its vertical or crate stopping position, the link 212, the bar 210 and the link 205 are moved to the right, for the relation of the parts shown in Figs. 28 and 29, and by the resulting movement of the lever 203, the block 201 and detent 23 are moved to the left. As more clearly shown in Fig. 29, the pivotal support 23a of the detent 23, is at the right hand end of said detent, and the detent is provided with a downwardly extending projection 23b below the pivot 23a, which projection is engaged by a spring 213 carried by the block 201, which tends to hold the detent in its upper position shown in Fig. 29. The upper surface of the block 201 is just below the outer bottom surface of the crates as they move along the crate runway over the block 201, and the teeth of the detent 23 project sufficiently above the block 201 for their upper position, so that they may engage the lower edge of a crate in its unloading position, the right hand edges of the teeth being beveled as indicated, so that the detent is depressed against the action of the spring 213, when the crates pass over said detent, and the other edges of said teeth being vertical surfaces to positively engage the crates one after another in their unloading position. It will be understood that the crates unloaded by my machine may be of different sizes, and the detent 23 is so constructed that one of its teeth will engage crates of one size, while another of its teeth will engage crates of another size, thus permitting crates of different sizes to be unloaded by my machine without changing the crate holding mechanism, the detent being illustrative of other sizes and types of detents that may be similarly used.

It will be observed that the detent 23 is in a vertical plane substantially mid way between the vertical leg of the angle bar 11, and the arm 22. This results in the detent 23 engaging one end of a crate being unloaded, at its mid portion, at the same time that the stop plate 25 and the stop arm 22 engage the other end portion of the crate. The amount of movement imparted to the detent 23 by movement of the stop arm 22 to its vertical position, is sufficient to compress the spring 206 with the detent 23 in engagement with a crate in its unloading position, and the spring 206 is of sufficient strength to positively move the detent and the side of the crate engaged thereby to square the crate against the stop plate 25 and the stop arm 22, if the crate is not in square condition. Movement of the stop arm 22 to its retracted position indicated at 22a, moves the detent 23 sufficiently to the right so that it may engage the next crate placed in unloading position.

As more clearly shown in Fig. 31, the lower portion of the block 201 is provided with a transverse groove 201b to receive the inner rounded end of the lever 203 so that oscillatory movement of said lever will impart reciprocatory movement to the block 201 as above described.

While my unloading machine is adapted to handle different kinds and sizes of bottles that may be placed in crates for delivery and return, it is particularly adapted for handling bottles used by dairies for milk, cream, etc. and the bottles illustrated as handled by my unloading machine, are milk bottles.

In Figs. 32 to 35 inclusive, I illustrate the devices employed to handle quart milk bottles. As shown in Fig. 34, a plurality of tubes 214 extend vertically with a sliding fit through the head 32, there being one of these tubes for each of the bottles to be handled by the head by a single operation thereof. Each of the tubes 214 is provided above the head 32 with a nut 215 to limit its downward movement, and at its lower end with a clamping ring 216 for securing a hollow rubber plug 217 to the lower end of the tube. A compression spring 218 is disposed around each of the tubes 214, between the head 32 and a flange on the tube engaging the ring 216, which spring tends to hold the tube in its lowermost position relatively to the head 32.

As more clearly shown in Fig. 35, each tube 214 is provided at its lower end with a flange 214a which is externally threaded to engage internal threads in the ring 216, said ring being provided at its lower end with an inwardly extending flange to engage an outwardly extending flange on the upper end of the corresponding plug 217. The plug 217 is preferably made of rubber or rubber compound and is hollow, its upper portion as illustrated in Fig. 35, being provided with a bore fitting a corresponding extension of the tube 214 below the flange 214a, the lower end of the bore in the extension of the tube 214 being threaded to receive an externally threaded stud 219 having an outwardly extending flange between its end portions and having its other end portion threaded to extend through a washer 220 and into threaded engagement with a nut 221 embedded in the material of the lower end portion of the plug 217. The plug 217 above the flange of the threaded stud 219, has a relatively thick wall so that the upper portion of the plug is not readily expanded by air pressure in it and further that the plug will withstand the wear incident to its use. Adjacent the flange of the stud 219, the wall of the plug 217 is much thinner than the wall of its upper portion, providing a compartment 222 for air under pressure, around the stud 219. The flange of the stud 219 is provided with a radial hole or holes 223 opening into the air compartment 222, and the upper end of the stud 219 is provided with a bore extending from its upper end to and communicating with said radial hole or holes. The upper end of the tube 214 is internally threaded to receive a threaded connection 224a carried by one end of a tube 224 of flexible material, for example, rubber or rubber compound, to communicate air under pressure to the compartment 222. In assembling the parts just described, the nut 221 is molded in the material of the plug 217 when it is made, the washer 220 is forced through the bore in the upper portion of the plug, the material of the plug being sufficiently resilient to permit this to be done, the stud 219 is tightly screwed into the lower end of the tube 214 and the lower end extension of the tube 214 is inserted into the plug and the tube is turned in the plug until the lower threaded end of the stud 219 tightly clamps the material of the plug between the nut 221 and the washer 220, which prevents the plug from elongating under the action of air under pressure in the compartment 222. Then the ring 216 is slipped over the plug 217 and screwed in place to securely hold the plug to the tube. The plug 217 is pointed at its lower end to facilitate entering the neck of a bottle 225, and when the plug is inserted in a bottle neck as illustrated in Fig. 35, and air under pressure is communicated to the compartment 222, the adjacent side wall of the plug is distended to tightly engage the inner surface of the neck of the bottle 225, for which condition the bottle is carried by the tube 214 and moved with it as desired.

As illustrated in Figs. 33 and 34, the head 32 is hollow as indicated at 32a around the portions of the head constituting vertical guideways for the tubes 214, and the other ends of the flexible tubes 224 are connected with the compartment thus formed in the head 32. A flexible tube or pipe 226 is also connected with the compartment in the head 32 to supply air under pressure thereto, as desired.

The stripper plate 66 above referred to is shown between the ring 216 and bottle 225 in Fig. 35, in the position it occupies when the bottle is engaged by the plug 217, so that when the stripper plate 66 is held against vertical movement as above described, and the tube 214 is raised to lift the plug 217 from the bottle 225, after the bottle is placed above the table plates 35, the bottle is prevented from following the upward movement of the plug, if for any reason there is slight adhesion between the plug 217 and the bottle when the air pressure in the compartment 222 is released.

The stripper plate 66 is held in the position illustrated in Figs. 33 and 34, by rods 227 extending through the head 32 and connected at their lower ends with the plate 66, said rods being extended above the head and having heads at their upper ends between which and the head 32, compression springs 228 are disposed around said rods 227, permitting upward movement of the head 32 relatively to the stripper plate 66 during a stripping operation.

As shown in Figs. 32 and 33, a guard bar 229 is supported horizontally below the stripper plate 66, adjacent the position of the outermost row of bottles handled by the head 32, to prevent any of said row of bottles from accidently tipping from the table plates 35 towards the crate that has been just unloaded, said bar 229 being connected with the lower ends of vertical supporting rods 230 extending through brackets 231 and 232 carried by the stripper plate 66 and the head 32 respectively, said rods 230 being freely movable in said brackets and limited as to downward movement by collars 233 rigidly secured to said rods.

To provide for the quick attachment of the head 32 to the yoke 31 and for the removal of the head from the yoke when desired, the head is provided with oppositely extending lugs 234, 234 having side slots therein for receiving studs 235, 235 extending downwardly from the ends of the yoke, said studs having threaded lower ends to receive nuts 236, 236 below the lugs 234, 234.

Thus all that is required to securely attach the head 32 to the yoke 31, after the lugs are in engagement with the studs 235, is to tighten the two nuts 236 and, similarly, releasing the two nuts 236 permits the head to be quickly and readily removed from the yoke 31. The only other operation required to completely remove the head 32 from the machine, is to uncouple the air supply pipe 226 from the head 32, which is facilitated by a screw connection 226a connecting the pipe 226 to the head. As stated, the head shown in Figs. 32, 33 and 34 is intended for use with quart milk bottles, these bottles being commonly carried in crates holding twelve bottles to the crate. For other sizes of bottles, for example, pint milk bottles, the crates are usually constructed to hold more than twelve bottles per crate, for example, eighteen bottles, and where it is required to unload such bottles from their crates by means of my machine, a head is used that is similar to the head 32, excepting that it is provided with a different number of plugs 217 arranged in rows corresponding to the number of rows of bottles in the crate, the number of plugs in each row corresponding to the number of bottles in each row in the crate. In some cases other numbers of bottles are carried by each crate, and to take care of such cases, the head employed with the yoke 31 is constructed with the plugs of a number and spacing corresponding with the number and spacing of the bottles carried by the crate. The different heads that may be required, are provided with lugs similar to the lugs 234 above described, having side slots that will register with the studs 235, so that the heads may be interchangeably mounted on the yoke 31, and the heads are similarly constructed in other respects, to the head 32 above described, and provided with connections for the air supply pipe 226 which are interchangeable with the corresponding connection on the head 32. In any case where a large number of bottles is handled each day, for example, in a large dairy, the crates and bottles of different sizes may conveniently be grouped, so that all of the crates and bottles in any group are of the same size, and where the bottles and crates are so grouped, my crate unloading machine may be used to advantage with all of the bottles and crates, by placing a first head on the yoke 31 adapted to handle the crates and bottles of the first group, then changing the head on the yoke 31 to accommodate the bottles of the next group and so on, only a few minutes being required to change from one head to another.

In Figs. 36 and 37, I illustrate the devices preferably employed to control supplying compressed air to the supply pipe 226, and relieving the air pressure in the head 32, as follows.

The arm 33 carries an air valve 237 with which the end of the air pipe 226 remote from the head 32 is connected, said valve also being connected with a flexible pipe 238 for supplying air under pressure to the valve from any suitable source not shown. As more clearly shown in Fig. 36, the air valve 237 consists of a block of suitable material having a bore 239 with which spaced ports 240, 241 and 242 communicate. The port 240 is connected with the pipe 238, the port 241 is connected with the pipe 226 and the port 242 opens to atmosphere to discharge the compressed air from the head 32 through the pipe 226 at proper times. The bore 239 contains a cylindrical valve rod 243 which is a sliding fit in said bore, and which is provided with a portion of reduced diameter between the end portions of said rod, the end portions of the rod and its portion of reduced diameter being so proportioned that when the rod is in its lower position, its central portion establishes communication between the ports 241 and 242, thereby permitting compressed air to flow from the head 32 through the pipe 226 to atmosphere, the upper end portion of the valve rod at the same time closing the port 240 to prevent the flow of compressed air from the source into the valve structure; and when the valve rod 243 is in its upper position, its lower portion closes the exhaust port 242, and its central portion of reduced diameter, establishes communication between the ports 240 and 241 to supply air under pressure from the pipe 238 to the pipe 226 and thus to the head 32. The valve rod 243 is of the balanced type, so that there is no tendency for it to move by the air pressures exerted upon it at any time, from one of its positions to the other, as a result of which it remains in either of its positions described until it is moved to its alternate position. The lower end of the valve rod 243 is extended below the valve block and connected pivotally by a loose connection, with one end of a bell crank lever 244 pivotally supported at 245 on a bracket 246 extending from the valve block. The other member of the bell crank lever 244 extends upwardly from its pivotal support 245, into the path of an operating screw 247 carried by a bar 248 which in turn is supported by the hub portions of the arm 30, as more clearly shown in Fig. 9. The screw 247 is adjustable relatively to the bar 248 so that when the arm 30 is turned to carry the bottles 225 supported by the head 32, over the table plates 35, and said arm reaches the end of its said turning movement, the screw 247 has engaged the bell crank lever 244 and moved the valve rod 243 downwardly to close the port 240 and establish communication between the ports 241 and 242, thus disconnecting the plugs 217 from the bottles 225 supported by the head 32, so that the final upward movement of the column 29 and of the head 32, which immediately follows the operation of the valve rod 243 just described, may move the plugs 217 upwardly and entirely out of the bottles.

The upper end portion 75 of the column housing 28, supports devices for actuating the valve rod 243 when the head 32 is directly above a crate to be unloaded, and the column 29 is in its lowermost position, as follows. The housing portion 75 has rigidly secured to it, a block 249 provided with a first vertical bore in alignment with the valve rod 243 when the head 32 is directly over a crate in its unloading position, which bore contains a rod 250 which fits the bore with a sliding fit at its lower portion, said rod being of reduced diameter above its lower portion and extending above the top of the block 249, through a bore of reduced diameter co-axial with the bore containing the lower end of the rod 250. The upper end of the rod 250 is engaged by the lower end of the valve rod 243 which extends slightly below its connection with the bell crank lever 244, when the column 29 is in its lowest position. The bore referred to in the block 249 contains a relatively weak compression spring 251 between the shouldered portion of the rod 250 and the upper end of the bore containing said spring. The block 249 also contains a second vertical bore in the upper portion of which a rod 252 is contained with a sliding fit, the lower portion of the latter bore containing a compression spring 253 which is substantially stronger than the spring 251 and which presses at its upper end against the rod 252, and at its lower end against a disk 254 carried by a rod 255 extending upwardly and loosely into the spring 253. A lever 256 is pivotally supported at 257 in a slot formed horizontally through the lower end portion of the block 249, so that one rounded end of the lever has resting upon it, the lower end of the rod 250, while the other rounded end of said lever has resting upon it the disk 254.

The end of the lever 256 adjacent the disk 254, is extended downwardly and outwardly to form a catch 258 for engaging a latch 259 pivotally supported at 260 on a bracket 261 extending from the block 249. The pivotal portion of the latch 259, is provided with a horizontally extending arm 259a which passes through a clearance opening therefor in the block 249, so that its inner rounded end is contained in a slot 252a formed through the rod 252. The rod 252 extends above the block 249 a sufficient distance to engage the lower end of the bracket 246 with which the rod 252 is in alignment when the head 32 is directly over a crate in the unloading position of the latter, before the column 29 has reached its lowermost position. At this time, the valve rod 243 is in its lowermost position through having been previously operated by the screw 247. The engagement between the bracket 246 and the rod 252 occurs before engagement between the rod 250 and the valve rod 243, and continued downward movement of the column 29, moves the rod 252 downwardly, compressing the spring 253 but without movement of the disk 254, since the latter is at that time held in its uppermost position by the catch 258 and the latch 259. Immediately after the compression of the spring 253 as described, the upper end of the slot 252a engages the arm 259a of the latch, and when the column 29 reaches its lowermost position, and at substantially the instant that it comes to rest, the latch 259 is moved from engagement with the catch 258, and the stored up energy in the spring 253 is released and moves the rod 250 upwardly through the action of the lever 256 against the action of the weaker spring 251, which upward movement of the rod 250 moves the valve rod 243 upwardly to its position closing the port 242 and establishing communication between the ports 240 and 241, so that the plugs 217 are expanded at just the instant that they are fully entered into the bottles to be lifted by the head. After this, when the column 29 begins its upward movement to lift the bottles from the crate being unloaded, the rod 252 is permitted to move upwardly under the action of the spring 253 and the latch 259 is moved to its position illustrated in Fig. 36 for engaging the catch 258, due to the engagement of the latch member 259a with the lower end of the slot 252a, the resulting compression of the spring 253 being comparatively small. For this condition, the force of the spring 251 is sufficient to move the rod 250 downwardly to move the catch 258 into engagement with the latch 259 and against the lower surface of the disk 254, thereby establishing a condition of the valve controlling mechanism carried by the block 249, ready to again operate the valve rod 243 as above described.

The several cams described are preferably proportioned to operate their respective parts in the manner above described, and to co-operate with each other in such operation as follows. Each of the cams represents a closed cycle of operation so that when it has moved the parts actuated by it as above described, the cam and the parts controlled thereby are in proper position to begin the next cycle of operation in each case. This facilitates mounting all of the cams with the exception of the fixed cam 177, on the cam shaft 78 which is continuously rotated in the same direction and at a uniform speed, depending upon the adjustment of the gear changing mechanism driving said shaft. Since a single shaft is involved in driving all of the rotary cams, the cycles of operation of said cams may be accurately adjusted relatively to each other, by the adjustment of said cams angularly on the shaft 78, and the relation of their cycles of operation to each other may be accurately maintained by rigidly securing them to said shaft.

The column lifting cam 117 is preferably constructed so that beginning with the uppermost position of the column immediately after the plugs 217 have been raised from the bottles just deposited upon the table plates 35, the column is held in its uppermost position while the column turning cam 118 swings the column 29 and the head 32 until the head is directly over the next crate to be unloaded, which is then in its unloading position. At the end of this turning movement of the column 29, or slightly before the end of said turning movement, the cam 117 lowers the column 29 and the head 32, and this lowering movement is continued until the column 29 and the head 32 are in their lowermost position, with the plugs 217 in the neck portions of the bottles to be unloaded from the crate. At this instant, the plugs 217 are expanded as above described, and the cam 117 at once begins to lift the column 29, which movement continues until the bottles removed from the crate are sufficiently raised so that they will just clear the table plates 35 when the head 32 is swung above said plates by the cam 118. When the head has reached the end of its swinging movement over the plates 35, the plugs 217 are at once disengaged from the bottles as above described, and the cam 117 immediately completes the lifting movement of the column 29 and the head 32, to their extreme uppermost position, so that the plugs 217 will clear the upper ends of the bottles, and the cam 117 is then in a position to repeat its cycle of operation, there being one complete cycle of operation for each of the rotary cams, for each rotation of the cam shaft 78.

The column turning cam 118 is preferably constructed to swing the head 32 from its bottle discharging position above the table plates 35, to a position directly over the next crate in its unloading position, during the time that the head is in its uppermost position, or substantially so, and to hold the head directly over the said next crate to be unloaded, during the downward movement of the plugs 217 into the necks of the bottles in the crate then in unloading position, which angular position of the head 32 is maintained until the upward movement of the column 29 has lifted the bottles clear of the crate and to a sufficient height so that the head 32 may be turned to move the bottles over the table plates 35 without striking the table plates, at which time the cam 118 turns the column so that the head 32 is in its bottle discharging position above the table plates 35, and all of the parts involved in turning the column are then ready to begin their next cycle of operation. It will be understood that parts of the angular and vertical movements of the column 29, may occur simultaneously, if preferred, to any extent that will not interfere with securing the results above described.

The cam 94 employed to lift the table plates 35, is preferably proportioned to lift said plates as above described, before or not later than the turning movement of the column placing the head 32 over said plates is completed, which position of the plates 35 is maintained by the cam 94 until the bottles have been released from the plugs 217 and the column 29 reaches its extreme upper position, at which time the cam 94 at once permits the table plates 35 to assume their lower position, so that the bottles deposited on the table plates may be removed by the chains 36 as above described. The complete removal of the bottles by the chains 36 is effected in ample time so that thereafter the table plates may again be raised as above described by the next cycle of operation of the cam 94, to receive the next group of bottles delivered by the head 32.

In general, the cams controlling the operation of the crates on the crate runway preferably co-operate so that the loaded crates are delivered to their unloading position one at a time, that a preceding unloaded crate is released from its unloading position and moving from such position before the next loaded crate is moved to its unloading position, and that each loaded crate is in its unloading position when the devices employed to hold it in its unloading position and to square it if it is in deformed condition, operate, in which position the crate is held during the engagement of the bottles therein by the plugs 217 and until said bottles have been lifted clear of the crate.

More specifically, the stop plate 25, the presser plate 21, the swinging stop arm 22 and the detent 23 engage and hold the crate being unloaded, in its unloading position until the bottles being removed from the crate are lifted a sufficient amount to clear the crate. At that time, the cam 153 operates to move the presser plate 21 to its retracted position and at the same time to move the stop plate 25 to its releasing position, at the same time moving the hook lever 164 to disengage the unloaded crate from the stop plate 25, and at the same time the cam 196 is moved to a position permitting the stop arm 22 to assume its lower position, and the released unloaded crate is moved by the chain 19 away from its unloading position. At the same time the unloaded crate is so released and begins its movement from its unloading position, the cam 143 operates to move the pusher bar 20 from its retracted position to its position disengaging the next loaded crate from engagement with the fixed stop 17, and the loaded crate thus released is moved by the chain 19 to its unloading position where it is stopped by the stop plate 25 on account of said stop plate having been released by the fixed cam 171, during the retracting movement of the presser plate 21. During the movement of the crate to its unloading position, the presser plate 21 is held in its retracted position, and immediately upon the crate reaching its unloading position, the cam 153 operates to move the presser plate 21 against the crate to hold it snugly against the plate 96, and at the same time the cam 196 operates to move the stop arm 22 to its crate stopping position and to move the detent 23 to a position to square the crate if it happens to be deformed, the action of the detent 23 in any event being to make certain that the crate is snugly against the stop plate 25 and the stop arm 22, in proper unloading position longitudinally of the runway.

Immediately after moving a loaded crate from the fixed stop 17, the pusher bar 20 is retracted by its cam 143 to permit the next loaded crate to engage said fixed stop.

In Fig. 39, I illustrate diagrammatically the electrical circuits employed to control the operation of the motors 52 and 62. Electric supply conductors are shown at 262 and 263. A wire 264 extends from the conductor 262 to the fixed contact 265 of a switch 266, the movable contact 267 of which is connected by a wire 268 with one terminal of the motor 52 the other terminal of which is connected by wire 269 with the other supply conductor 263. The switch 266 is of the type having "on" and "off" buttons, so that depressing one of said buttons closes the contacts 265 and 267, and depressing the other of said buttons opens said contacts, said contacts remaining either open or closed until actuated by one of said buttons to establish the alternate relation of said contacts. The switch 266 thus provides a means for starting and stopping the motor 52 as desired. Reducing gearing 52a is shown between the motor 52 and the shaft 51, by which the shaft 51 may be driven at a desired speed less than the speed of the motor 52.

The switch 109 contains a fixed contact 270 for engagement by a movable contact 271 carried by an arm 272, when a spring 273 between the arm 272 and the casing of the switch, is free to move said arm 272 and the contact 271 carried thereby, towards the contact 270. The operating button 108 extends into the switch casing and towards the arm 272, so that depressing the button opens the contacts 270 and 271 against the action of the spring 273, and releasing said button permits said spring to close said contacts.

The switch 184 contains an arm 274 carrying a movable contact 275 for engagement with a fixed contact 276, when the arm 274 is moved towards said fixed contact against the action of a spring 277 between the arm 274 and the casing of the switch, which spring tends to move the contact 275 from engagement with the contact 276. The arm 274 is mechanically connected through the casing of the switch, with the operating arm 185 thereof, so that pressure on the arm 185 by the arm extension 26a due to the action of the spring 186 as described above in connection with Figs. 24 to 26 inclusive, closes the contacts 275 and 276 against the action of the spring 277, the spring 186 being much stronger than the spring 277. When the arm 185 is free from engagement with the arm extension 26a as above described, the spring 277 establishes an open condition of the contacts 275 and 276.

The switch 278 is of the same type as the switch 266 above described, and is provided with a fixed contact 279, a movable contact 280 and buttons operating substantially as described for the switch 266. The switch 278 controls the starting and stopping of the motor 62, when the contacts of the switches 109 and 184 are in their closed condition, which is their condition for the operation of the unloading machine, unless the condition of a crate or the improper handling of the unloaded crates interferes, as above described, with the effective operation of the unloading devices, the switches 109 and 184 thus constituting safety devices controlling the motor 62 to prevent damage to the unloading devices and to the bottles being unloaded.

The switches 109, 184 and 278 are connected with the motor 62 as follows: a wire 281 connects the supply conductor 262 with the contact 275 of switch 184; the contact 276 of switch 184 is connected by wire 282 with the contact 270 of switch 109; the contact 271 of switch 109 is connected by wire 283 with the contact 280 of switch 278; and the contact 279 of switch 278 is connected by wire 284 with one terminal of the motor 62, the other terminal of which is connected by wire 285 with the supply conductor 263. From the circuit connections just described, it will appear that opening the contacts of either of the switches 109 and 184, when the contacts of the other switches connected with the motor 62 are in their closed condition, opens the circuit of the motor 62 and stops its operation, and that with the contacts of the switches 109 and 184 in their closed condition, the operation of the motor 62 may be controlled by the switch 278.

The construction of bottle lifting mechanism above described in connection with Fig. 35, is effective in handling bottles having necks large enough to receive the inflatable plugs 217 and where the bottle necks are dry or substantially so. Where it is required to unload bottles having relatively small necks and where the bottles are wet or slippery when they must be handled by the mechanism, I find that the construction of bottle engaging and lifting mechanism illustrated in Figs. 40 to 46 inclusive, is desirable. As shown in the latter figures, each bottle handling device consists of a tube 314, provided at its upper end with a fitting 315 which is a turning fit on the tube, and adapted to be clamped to the tube in any desired position angularly, by a screw 316 threaded into the upper end of the bore 314a in the tube. Below the screw 316, the tube is provided with a transverse bore or passageway 314b opening at its ends into a circular recess 315a in the fitting 315 extending around the end portion of the tube and communicating with a threaded passageway 315b in the fitting displaced laterally from the tube to receive the threaded connection on one end of one of the tubes 224. The tube 314 is constructed to be mounted in the head 32 and to have movement relatively thereto in the same manner as described above for the tube 214, excepting that the tube 314 is held in the head against the action of the spring 218 then placed around the lower portion of the tube 314, by the fitting 315. The screw 316 permits any desired angular relation between the fitting 315 and the tube 314, to the end that the connected tube 224 may have its most effective position connecting the tube 314 with the head 32, for any desired angular position of the parts carried by the lower portion of the tube 314, for which relation, the fitting 315 is tightly clamped on the tube by the screw 316.

The lower portion of the tube 314 carries a head 319 from which parallel walls 320, 320 extend downwardly to support the ends of pivot rods 321, 321 mounting jaws 322, 322 between said walls for angular movement. The jaws 322, 322 extend below the walls 320, 320, and when in their open position shown in Fig. 41, the space between them is sufficient to freely receive a bottle neck between them, after which angular movement of the jaws towards the bottle neck effects clamping engagement between the jaws and the outer surface of the bottle neck, as illustrated for the bottle 325 in Fig. 45. The inner surfaces of the jaws 322, 322, are preferably provided with linings 323, 323 of resilient material, for example, rubber, to provide a cushioned or yielding engagement with the bottle neck.

The jaws 322, 322 are extended above their pivot rods, and at their upper ends they are pivotally connected with the outer ends of toggle links 327 and 328, which at their inner ends extend into a slot 329a in the lower end of a piston 329 mounted with a sliding fit in a bore in the lower end of the tube 314, which bore is in communication at its upper end with the smaller bore 314a in the tube 314. The inner ends of the links 327 and 328 are connected together and with the lower end of the piston 329 by a pivot rod 330, and the upper end of the piston is provided with a flanged packing washer 331 held in place by a screw 332 having a head somewhat longer than the axial length of said washer, to engage the upper end of the bore containing said piston when the latter is in its uppermost position.

As more clearly shown in Figs. 43 and 44, a disk 333 is secured to the lower ends of the walls 320, 320, by screws 334, 334, in recesses provided therefor in the ends of said walls, said disk having an edge flange 333a engaging corresponding grooves in the ends of said walls, whereby the lower ends of said walls are substantially reinforced and strengthened. The disk 333 carries at its central portion a downwardly extending tubular member 335 containing the lower portion of a helical spring 336, and provided at its lower end with a screw 337, the upper end of said spring being seated in the lower end of the piston 329 below the links 327 and 328. Said spring is of such proportions and strength as to positively move the jaws 322, 322 to their bottle releasing position shown in Fig. 41, when the piston 329 is not subjected to fluid pressure substantially greater than atmospheric pressure.

A disk 338 of protective material, for example, hard rubber, is held against the lower surface of the disk 333, by a protective tubular member 339, for example, of hard rubber, which closely fits the tubular member 335, and is provided in its lower solid end portion with screw threads for engaging the screw 337 to hold the member 339 in place. The member 339 is preferably provided with a long tapered and sharply pointed lower end, the body portion of said member being of a size to freely enter the neck of a bottle to be engaged by the jaws 322, 322, whereby said member serves to center the neck of the bottle between said jaws and effect proper engagement between said jaws and the neck of the bottle, when the jaws are moved towards the bottle neck. In Figs. 43 and 44, the protective disk 338 and the protective member 339 are removed to more clearly show the remaining parts.

Tubes 314 of the construction described, are interchangeable in the head 32, with the tubes 214 previously described, and when used, a spring 218 is placed around each of the tubes 314 between the head 32 and the head 319 of the tube, for the same purpose and with the same effect as described for the tubes 214.

The operation of the machine when using the bottle lifting mechanism shown in Figs. 40 to 46 inclusive, is the same as when using the bottle lifting mechanism described in connection with Fig. 35, the gripping of the bottle necks by the jaws 322, 322 as a result of fluid pressure in the tubes 314, corresponding with the inflation of the plugs 217 by fluid pressure in the tubes 214, and the releasing of the bottle necks by outward movement of the jaws 322, 322 resulting from reducing the fluid pressure in the tubes 314, corresponding with collapsing the plugs 217 by reducing the fluid pressure in the tubes 214.

In using the bottle lifting mechanism shown in

Figs. 40 to 46 inclusive, a stripper plate for disengaging the lifted bottles is not required, since the centered protective member 339 positively breaks any adhesion that may occur between a bottle neck and the cushioning material 323 of either of the jaws, when the jaws are opened, and the loose fit of the member 339 in the bottle neck and the material of which said member is made, prevent said member from jamming in or adhering to the bottle neck.

From the above it will appear that by my invention I provide devices for removing bottles of various kinds from crates or containers employed to handle such bottles in groups, and mechanism for delivering the removed bottles in a single row to facilitate subsequent operations upon them, as well as devices for moving the loaded crates or containers successively to their unloading position and removing unloaded crates or containers, all of which devices and mechanism are completely automatic in operation and may be operated with a rapidity limited only by the speed with which the crates or containers can be successively moved to and from their unloading position without interference with each other, and by the speed with which the removed bottles can be handled without danger of breaking them; also, that I provide safety devices for automatically protecting both the unloading machine and the bottles from damage, in the event the normal operation of the machine is interfered with; also, that the several operations of removing and handling the bottles and handling the loaded and unloaded crates or containers are so timed and related as to eliminate delay and loss of time between said operations, thereby reducing the time interval of each complete cycle of operation of the unloading machine, to the smallest amount possible in view of the physical limitations incident to the work being done by the machine, and that the said timing and relation is absolutely maintained, without the possibility of said operations becoming displaced relatively to each other in said cycle.

My unloading machine may be used with bottles of any kind adapted to be handled by the devices described, or their equivalent, to unload such bottles from crates or containers of any kind adapted to such unloading, and adapted to be handled by the crate handling devices described, or their equivalent.

While I have shown my invention in the particular embodiment above described, it will be understood that I do not limit myself to this exact construction as I may employ equivalents known to the art at the time of the filing of this application without departing from the scope of the appended claims.

What I claim is:

1. Apparatus for use in and as a part of a bottle-crate unloading machine having a head movable vertically and horizontally from a crate unloading position to a bottle delivering position, members carried by said head for engaging bottles and moving the same from said unloading position to said delivering position, a first conveyor for moving to said unloading position crates containing bottles, and a second conveyor for moving bottles from said delivering position, characterized by the combination of devices connected with said members and operable by fluid under pressure, means for supplying fluid under pressure to said devices and releasing said fluid pressure as desired, to operate said members, and mechanism connected with said head and first raising said head to bottle delivering position with said members engaging and carrying said bottles, and then with said members released from said bottles further lifting said head to clear said members from said bottles.

2. Apparatus for use in and as a part of a bottle-crate unloading machine having a head movable vertically and horizontally from a crate unloading position to a bottle delivering position, members carried by said head for engaging bottles and moving the same from said unloading position to said delivering position, a first conveyor for moving to said unloading position crates containing bottles, and a second conveyor for moving bottles from said delivering position, characterized by the combination of a rectangular metal block constituting said head, rods extending downwardly from said head and arranged in rows extending in two directions across said head, there being one of said rods for and in line with each bottle compartment in the crate to be unloaded, bottle engaging and moving members carried by each of said rods, means for simultaneously operating all of said members, whereby all of the bottles in a crate having rows of bottles extending lengthwise and crosswise of the crate may be removed therefrom by a single operation of the head, and mechanism connected with said head and first raising said head to bottle delivering position with said members engaging and carrying said bottles, and then with said members released from said bottles further lifting said head to clear said members from said bottles.

3. Apparatus for use in and as a part of a bottle-crate unloading machine having a head movable vertically and horizontally from a crate unloading position to a bottle delivering position, members carried by said head for engaging bottles and moving the same from said unloading position to said delivering position, a first conveyor for moving to said unloading position crates containing bottles, and a second conveyor for moving bottles from said delivering position, characterized by the combination of devices connected with said members and operable by fluid under pressure, means for supplying fluid under pressure to said devices and releasing said fluid pressure as desired, to operate said members, and mechanism for engaging the sides and ends of a crate in unloading position to equalize the angles of a deformed crate and free bottles therein for unloading.

4. Apparatus for use in and as a part of a bottle-crate unloading machine having a head movable vertically and horizontally from a crate unloading position to a bottle delivering position, members carried by said head for engaging bottles and moving the same from said unloading position to said delivering position, a first conveyor for moving to said unloading position crates containing bottles, and a second conveyor for moving bottles from said delivering position, characterized by the combination of devices connected with said members and operable by fluid under pressure, means for supplying fluid under pressure to said devices and releasing said fluid pressure as desired, to operate said members, and mechanism for engaging the sides and ends of a crate in unloading position to equalize the angles of a deformed crate and free bottles therein for unloading, said angle equalizing mechanism including resilient members to accommodate said equalizing mechanism to variations in crate dimensions.

5. Apparatus for use in and as a part of a bottle-crate unloading machine having a head movable vertically and horizontally from a crate unloading position to a bottle delivering position, members carried by said head for engaging bottles and moving the same from said unloading position to said delivering position, a first conveyor for moving to said unloading position crates containing bottles, and a second conveyor for moving bottles from said delivering position, characterized by the combination of devices connected with said members and operable by fluid under pressure, means for supplying fluid under pressure to said devices and releasing said fluid pressure as desired, to operate said members, means for operating said head, and a stopping device controlling said operating means and engaging a crate in unloading position and movable with the crate upwardly from said first conveyor to stop said operating means.

6. Apparatus for use in and as a part of a bottle-crate unloading machine having a head movable vertically and horizontally from a crate unloading position to a bottle delivering position, members carried by said head for engaging bottles and moving the same from said unloading position to said delivering position, a first conveyor for moving to said unloading position crates containing bottles, and a second conveyor for moving bottles from said delivering position, characterized by the combination of devices connected with said members and operable by fluid under pressure, means for supplying fluid under pressure to said devices and releasing said fluid pressure as desired, to operate said members, means for operating said head, a crate stop for holding a crate in unloading position on said first conveyor and movable from stopping position after unloading the crate, whereby unloaded crates are delivered from unloading position in spaced relation, and a stopping device controlling said operating means and having cyclic movement into the spaces between said unloaded and delivered crates and stopping said operating means when said cyclic movement is prevented by a delivered and unloaded crate.

7. In a machine for unloading bottles from crates, the combination of a vertical column mounted for vertical and turning movements, an arm carried by said column, a head carried by said arm, lifting members carried by said head for engaging the necks of bottles in a crate to be unloaded and operable by fluid under pressure to engage and carry said bottles, means for supplying fluid under pressure to said members and releasing said fluid pressure as desired, and a table for receiving bottles carried by said members, said table comprising spaced plates having upper and lower resting positions, and conveyors between said plates and below said plates for the upper position thereof and above said plates for the lower position thereof, said conveyors consisting of two portions successively engaging bottles delivered on said table, the conveyor portions first engaging said bottles having slower movement than the other conveyor portions, whereby the spacing between rows of bottles delivered on said table and extending transversely thereof is increased.

8. In a machine for unloading bottles from crates, the combination of a vertical column mounted for vertical and turning movements, an arm carried by said column, a head carried by said arm, lifting members carried by said head for engaging the necks of bottles in a crate to be unloaded and operable by fluid under pressure to engage and carry said bottles, means for supplying fluid under pressure to said members and releasing said fluid pressure as desired, a table for receiving bottles carried by said members, said table comprising spaced plates having upper and lower resting positions, conveyors between said plates and below said plates for the upper position thereof and above said plates for the lower position thereof, and movable members under said plates controlling the position thereof vertically.

9. In a machine for unloading bottles from crates, the combination of a vertical column mounted for vertical and turning movements, an arm carried by said column, a head carried by said arm, lifting members carried by said head for engaging the necks of bottles in a crate to be unloaded and operable by fluid under pressure to engage and carry said bottles, means for supplying fluid under pressure to said members and releasing said fluid pressure as desired, a table for receiving bottles carried by said members, a crate conveyor, a stop for holding a crate on said crate conveyor in unloading position, and two members movable relatively to and towards each other to press against the ends of a crate held by said stop to square crates that may be in deformed condition.

10. In a machine for unloading bottles from crates, the combination of a vertical column mounted for vertical and turning movements, an arm carried by said column, a head carried by said arm, lifting members carried by said head for engaging the necks of bottles in a crate to be unloaded and operable by fluid under pressure to engage and carry said bottles, means for supplying fluid under pressure to said members and releasing said fluid pressure as desired, a table for receiving bottles carried by said members, a crate conveyor, a stop for holding a crate on said crate conveyor in unloading position, and two members movable relatively to and towards each other to press against the ends of a crate held by said stop to square crates that may be in deformed condition, said two members comprising an oscillatory stop arm and a detent having a plurality of spaced teeth for crate engagement, whereby crates of different lengths may be squared by said two members.

11. In a machine for unloading bottles from crates, the combination of a vertical column mounted for vertical and turning movements, an arm carried by said column, a head carried by said arm, lifting members carried by said head for engaging the necks of bottles in a crate to be unloaded and operable by fluid under pressure to engage and carry said bottles, means for supplying fluid under pressure to said members and releasing said fluid pressure as desired, a table for receiving bottles carried by said members, a crate conveyor, a stop for holding a crate on said crate conveyor in unloading position, and presser means movable laterally against a crate held by said stop to hold said crate against lateral movement on said crate conveyor.

12. In a machine for unloading bottles from crates, the combination of a vertical column mounted for vertical and turning movements, an arm carried by said column, a head carried by said arm, lifting members carried by said head for engaging the necks of bottles in a crate to be unloaded and operable by fluid under pressure to engage and carry said bottles, means for supplying fluid under pressure to said members and releasing said fluid pressure as desired, a table for receiving bottles carried by said members, a crate conveyor, a stop for holding a crate on said crate conveyor in unloading position, and presser means movable laterally against a crate held by said stop to hold said crate against lateral movement on said crate conveyor, said presser means comprising a head movable transversely of said crate conveyor, a rod extending through said head in the direction of movement thereof and with a sliding fit, a plate extending longitudinally of said crate conveyor and carried by the end of said rod nearer said crate conveyor, and a spring tending to move said plate towards a crate to be engaged thereby, whereby crates of different widths may be acted upon by said presser means.

13. In a machine for unloading bottles from crates, the combination of a vertical column mounted for vertical and turning movements, an arm carried by said column, a head carried by said arm, lifting members carried by said head for engaging the necks of bottles in a crate to be unloaded and operable by fluid under pressure to engage and carry said bottles, means for supplying fluid under pressure to said members and releasing said fluid pressure as desired, a table for receiving bottles carried by said members, a crate conveyor, a first stop for holding a crate on said crate conveyor in unloading position, presser means movable laterally against a crate held by said stop to hold said crate against lateral movement on said crate conveyor, a second crate stop adjacent said crate conveyor and restraining crates thereon from movement thereby to unloading position, and a device movable to release the crates from said second stop one at a time for movement to unloading position.

14. In a machine for unloading bottles from crates, the combination of a vertical column mounted for vertical and turning movements, an arm carried by said column, a head carried by said arm, lifting members carried by said head for engaging the necks of bottles in a crate to be unloaded and operable by fluid under pressure to engage and carry said bottles, means for supplying fluid under pressure to said members and releasing said fluid pressure as desired, a table for receiving bottles carried by said members, a crate conveyor, a first stop for holding a crate on said crate conveyor in unloading position, a first device movable to release an unloaded crate from said stop, presser means movable laterally against a crate held by said first stop to hold said crate against lateral movement on said crate conveyor, a second crate stop adjacent said crate conveyor and restraining crates thereon from movement thereby to unloading position, and a second device movable to release the crates from said second stop one at a time for movement to unloading position.

15. In a machine for unloading bottles from crates, the combination of a vertical column mounted for vertical and turning movements, an arm carried by said column, a head carried by said arm, lifting members carried by said head for engaging the necks of bottles in a crate to be unloaded and operable by fluid under pressure to engage and carry said bottles, means for supplying fluid under pressure to said members and releasing said fluid pressure as desired, a table for receiving bottles carried by said members, a crate conveyor, a first stop for holding a crate on said crate conveyor in unloading position, a first device movable to release an unloaded crate from said stop, presser means movable laterally against a crate held by said first stop to hold said crate against lateral movement on said crate conveyor, a second crate stop adjacent said crate conveyor and restraining crates thereon from movement thereby to unloading position, a second device movable to release the crates from said second stop one at a time for movement to unloading position, and two additional members movable relatively to and towards each other to press against the ends of a crate to square crates that may be in deformed condition.

16. In a machine for unloading bottles from crates, the combination of a vertical column mounted for vertical and turning movements, an arm carried by said column, a head carried by said arm, lifting members carried by said head for engaging the necks of bottles in a crate to be unloaded and operable by fluid under pressure to engage and carry said bottles, means for supplying fluid under pressure to said members and releasing said fluid pressure as desired, a table for receiving bottles carried by said members, said table comprising spaced plates having upper and lower resting positions, conveyors between said plates and below said plates for the upper position thereof and above said plates for the lower position thereof, movable members under said plates controlling the position thereof vertically, a cam shaft, a first cam on said shaft controlling vertical movement of said column, a second cam on said shaft controlling turning movement of said column, and a third cam on said shaft controlling movement of said movable members.

17. In a machine for unloading bottles from crates, the combination of a vertical column mounted for vertical and turning movements, an arm carried by said column, a head carried by said arm, lifting members carried by said head for engaging the necks of bottles in a crate to be unloaded and operable by fluid under pressure to engage and carry said bottles, means for supplying fluid under pressure to said members and releasing said fluid pressure as desired, a table for receiving bottles carried by said members, a crate conveyor, a stop for holding a crate on said crate conveyor in unloading position, a cam shaft, a first cam on said shaft and first devices connecting said first cam with said column and effecting vertical movement of said column, a second cam on said shaft and second devices connecting said second cam with said column and effecting turning movement of said column, and a third cam on said shaft and third devices connecting said third cam with said stop for moving said stop to crate releasing position.

18. In a machine for unloading bottles from crates, the combination of a vertical column mounted for vertical and turning movements, an arm carried by said column, a head carried by said arm, lifting members carried by said head for engaging the necks of bottles in a crate to be unloaded and operable by fluid under pressure to engage and carry said bottles, means for supplying fluid under pressure to said members and releasing said fluid pressure as desired, a table for receiving bottles carried by said members, a crate conveyor, a stop for holding a crate on said crate conveyor in unloading position, a device movable to release an unloaded crate from said stop, a cam shaft, a first cam on said shaft and first devices connecting said first cam with said column and effecting vertical movement of said column, a second cam on said shaft and second devices connecting said second cam with said column and effecting turning movement of said column, and a third cam on said shaft and third devices connecting said third cam with said crate releasing device and effecting movement of said crate releasing device.

19. In a machine for unloading bottles from crates, the combination of a vertical column mounted for vertical and turning movements, an arm carried by said column, a head carried by said arm, lifting members carried by said head for engaging the necks of bottles in a crate to be unloaded and operable by fluid under pressure to engage and carry said bottles, means for supplying fluid under pressure to said members and releasing said fluid pressure as desired, a table for receiving bottles carried by said members, a crate conveyor, a stop for holding a crate on said crate conveyor in unloading position, two members movable relatively to and towards each other to press against the ends of a crate held by said stop to square crates that may be in deformed condition, a cam shaft, a first cam on said shaft controlling vertical movement of said column, a second cam on said shaft controlling turning movement of said column, a third cam on said shaft for moving said stop to crate releasing position, and a fourth cam on said shaft controlling movement of said two members.

20. In a machine for unloading bottles from crates, the combination of a vertical column mounted for vertical and turning movements, an arm carried by said column, a head carried by said arm, lifting members carried by said head for engaging the necks of bottles in a crate to be unloaded and operable by fluid under pressure to engage and carry said bottles, means for supplying fluid under pressure to said members and releasing said fluid pressure as desired, a table for receiving bottles carried by said members, a crate conveyor, a stop for holding a crate on said crate conveyor in unloading position, presser means movable laterally against a crate held by said stop to hold said crate against lateral movement on said crate conveyor, a cam shaft, a first cam on said shaft controlling vertical movement of said column, a second cam on said shaft controlling turning movement of said column, and additional cam mechanism on said shaft for moving said stop to crate releasing position and controlling movement of said presser means.

21. In a machine for unloading bottles from crates, the combination of a vertical column mounted for vertical and turning movements, an arm carried by said column, a head carried by said arm, lifting members carried by said head for engaging the necks of bottles in a crate to be unloaded and operable by fluid under pressure to engage and carry said bottles, means for supplying fluid under pressure to said members and releasing said fluid pressure as desired, a table for receiving bottles carried by said members, a crate conveyor, a first stop for holding a crate on said crate conveyor in unloading position, a second crate stop adjacent said crate conveyor and restraining crates thereon from movement thereby to unloading position, a device movable to release the crates from said second stop one at a time for movement to unloading position, a cam shaft, a first cam on said shaft and first devices connecting said first cam with said column and effecting vertical movement of said column, a second cam on said shaft and second devices connecting said second cam with said column and effecting turning movement of said column, a third cam on said shaft and third devices connecting said third cam with said first stop for moving said first stop to crate releasing position, and a fourth cam on said shaft and fourth devices connecting said fourth cam with said movable device and effecting movement of said movable device.

22. In a machine for unloading bottles from crates, the combination of a vertical column mounted for vertical and turning movements, an arm carried by said column, a head carried by said arm, lifting members carried by said head for engaging the necks of bottles in a crate to be unloaded and operable by fluid under pressure to engage and carry said bottles, means for supplying fluid under pressure to said members and releasing said fluid pressure as desired, a table for receiving bottles carried by said members, a crate conveyor, a first stop for holding a crate on said crate conveyor in unloading position, presser means movable laterally against a crate held by said stop to hold said crate against lateral movement on said crate conveyor, a second crate stop adjacent said crate conveyor and restraining crates thereon from movement thereby to unloading position, a device movable to release the crates from said second stop one at a time for movement to unloading position, a cam shaft, a first cam on said shaft controlling vertical movement of said column, a second cam on said shaft controlling turning movement of said column, a third cam on said shaft for moving said first stop to crate releasing position and also controlling movement of said presser means, and a fourth cam on said shaft controlling movement of said movable device.

23. In a machine for unloading bottles from crates, the combination of a vertical column mounted for vertical and turning movements, an arm carried by said column, a head carried by said arm, lifting members carried by said head for engaging the necks of bottles in a crate to be unloaded and operable by fluid under pressure to engage and carry said bottles, means for supplying fluid under pressure to said members and releasing said fluid pressure as desired, a table for receiving bottles carried by said members, a crate conveyor, a first stop for holding a crate on said crate conveyor in unloading position, a first device movable to release an unloaded crate from said stop, presser means movable laterally against a crate held by said first stop to hold said crate against lateral movement on said crate conveyor, a second crate stop adjacent said crate conveyor and restraining crates thereon from movement thereby to unloading position, a second device movable to release the crates from said second stop one at a time for movement to unloading position, a cam shaft, a first cam on said shaft controlling vertical movement of said column, a second cam on said shaft controlling turning movement of said column, a third cam on said shaft controlling movement of said first device and also controlling movement of said presser means, and a fourth cam on said shaft controlling movement of said second device.

24. In a machine for unloading bottles from crates, the combination of a vertical column mounted for vertical and turning movements, an arm carried by said column, a head carried by said arm, lifting members carried by said head for engaging the necks of bottles in a crate to be unloaded and operable by fluid under pressure to engage and carry said bottles, means for supplying fluid under pressure to said members and releasing said fluid pressure as desired, a table for receiving bottles carried by said members, a crate conveyor, a first stop for holding a crate on said crate conveyor in unloading position, a first device movable to release an unloaded crate from said stop, presser means movable laterally against a crate held by said first stop to hold said crate against lateral movement on said crate conveyor, a second crate stop adjacent said crate conveyor and restraining crates thereon from movement thereby to unloading position, a second device movable to release the crates from said second stop one at a time for movement to unloading position, two additional members movable relatively to and towards each other to press against the ends of a crate to square crates that may be in deformed condition, a cam shaft, a first cam on said shaft controlling vertical movement of said column, a second cam on said shaft controlling turning movement of said column, a third cam on said shaft controlling movement of said first device and also controlling movement of said presser means, a fourth cam on said shaft controlling movement of said second device, and a fifth cam on said shaft controlling movement of said two additional members.

25. In a machine for unloading bottles from crates, the combination of a crate conveyor, mechanism for removing bottles from crates on said conveyor, an electric motor for driving said removing mechanism, a switch in circuit with said motor, a switch-operating member engaging a crate in unloading position and movable with said crate for upward movement of the latter during its unloading, and operating devices between said switch-operating member and said switch opening said switch by upward movement of said switch-operating member.

26. In a machine for unloading bottles from crates, the combination of a crate conveyor, mechanism for removing bottles from crates on said conveyor, an electric motor for driving said removing mechanism, a switch in circuit with said motor, and a switch-controlling member having cyclic movement into the spaces between crates delivered by said conveyor from their unloading position and opening said switch when restrained from said movement by engagement with a crate.

27. In a machine for unloading bottles from crates, the combination of a crate conveyor, mechanism for removing bottles from crates on said conveyor, a stop limiting movement of a loaded crate on said conveyor to the unloading position thereof, and members relatively movable towards each other to engage opposite ends of a crate in unloading position for making the crate angles equal.

28. In a machine for unloading bottles from crates, the combination of a crate conveyor, mechanism for removing bottles from crates on said conveyor, an electric motor for driving said removing mechanism, a switch in circuit with said motor, a switch-controlling member having cyclic movement into the spaces between crates delivered by said conveyor from their unloading position and opening said switch when restrained from said movement by engagement with a crate, a cam shaft, and separate cams on said shaft severally controlling movement of said removing mechanism and said member.

29. In a machine for unloading bottles from crates, the combination of devices for removing bottles from a crate, an electric motor for driving said devices, a switch in circuit with said motor, and a member operatively related to said switch and for engagement with a crate during the removal of bottles therefrom and movable with said crate to open said switch when said crate moves with said bottles during the removal movement of said bottles.

30. Apparatus for handling crates, consisting of the combination of a conveyor, devices for delivering crates to said conveyor in spaced relation, an electric motor for driving said devices, a switch in circuit with said motor, and a member operatively related to said switch and having cyclic movement into the spaces between said crates and opening said switch when restrained from said movement by engagement with a crate.

31. Safety switch mechanism, consisting of the combination of a support having periodic movement, an electric switch carried by said support and movable therewith, and a member operatively related to said switch and having periodic movement with said switch and operating said switch when said periodic movement of said member is restrained.

CHARLES STECHER.